(12) United States Patent
Morrison et al.

(10) Patent No.: US 11,579,754 B2
(45) Date of Patent: Feb. 14, 2023

(54) METHOD AND SYSTEM FOR PRESENTING AND OPERATING A SKILL-BASED ACTIVITY

(71) Applicant: Vetnos LLC, New York, NY (US)

(72) Inventors: James Morrison, Henderson, NV (US); Daniel K. Orlow, New York, NY (US); David Manpearl, Venice, CA (US); Kenneth White, Las Vegas, NV (US); Benjamin Scott Stahlhood, II, Hutchinson Island, FL (US)

(73) Assignee: Vetnos LLC, New York, NY (US)

( * ) Notice: Subject to any disclaimer, the term of this patent is extended or adjusted under 35 U.S.C. 154(b) by 0 days.

(21) Appl. No.: 17/527,496

(22) Filed: Nov. 16, 2021

(65) Prior Publication Data

US 2022/0147201 A1 May 12, 2022

Related U.S. Application Data

(63) Continuation of application No. 17/509,766, filed on Oct. 25, 2021, now abandoned, which is a
(Continued)

(51) Int. Cl.
*G07F 17/32* (2006.01)
*G06F 3/0482* (2013.01)
*G06Q 50/34* (2012.01)

(52) U.S. Cl.
CPC ........... *G06F 3/0482* (2013.01); *G06Q 50/34* (2013.01); *G07F 17/326* (2013.01);
(Continued)

(58) Field of Classification Search
CPC ............. G07F 17/3239; G07F 17/3244; G07F 17/326; G07F 17/3288; G07F 17/3295; G06F 3/0482; G06Q 50/34
See application file for complete search history.

(56) References Cited

U.S. PATENT DOCUMENTS

| 5,573,244 A | 11/1996 | Mindes |
| 7,563,162 B2 | 7/2009 | Lawson et al. |
| (Continued) | | |

FOREIGN PATENT DOCUMENTS

| AU | 2013242817 A1 | 4/2014 |
| WO | 2009/089246 A2 | 7/2009 |

OTHER PUBLICATIONS

Fielding, Roy Thomas, "Architectural Styles and the Design of Network-based Software Architectures,"*Dissertation*, University of California, Irvine, 180 pages (2000).
(Continued)

*Primary Examiner* — James S. McClellan
*Assistant Examiner* — Ross A Williams
(74) *Attorney, Agent, or Firm* — Sunstein LLP

(57) ABSTRACT

A system for presenting a skill-based game, the system includes at least one server to serve a set of matchups of participants of an event, to a plurality of presentation devices, the plurality of presentation devices displaying the set of matchups on a display; to receive over the wide area network data from the presentation devices characterizing a set of user selected winners of the matchups made by the users; update the event data pertinent to participants in the actual events; using the updated data to calculate and assign payoffs to the users based on fixed payoff odds. A related computer-implemented method provides participant matchups to an operator organizing such a skill-based game.

18 Claims, 19 Drawing Sheets

Related U.S. Application Data continuation of application No. 17/184,264, filed on Feb. 24, 2021, now Pat. No. 11,157,147, which is a continuation of application No. 16/502,169, filed on Jul. 3, 2019, now Pat. No. 11,042,264, which is a continuation of application No. 14/847,795, filed on Sep. 8, 2015, now Pat. No. 10,353,543.

(60) Provisional application No. 62/106,613, filed on Jan. 22, 2015, provisional application No. 62/047,473, filed on Sep. 8, 2014.

(52) U.S. Cl.
CPC ...... *G07F 17/3239* (2013.01); *G07F 17/3244* (2013.01); *G07F 17/3288* (2013.01); *G07F 17/3295* (2013.01)

(56) References Cited

U.S. PATENT DOCUMENTS

| | | |
|---|---|---|
| 7,614,944 B1 | 11/2009 | Hughes et al. |
| 8,099,113 B2 | 1/2012 | Morrison |
| 8,126,479 B2 | 2/2012 | Morrison |
| 8,126,480 B2 | 2/2012 | Morrison |
| 8,538,563 B1 | 9/2013 | Barber |
| 9,098,883 B2 | 8/2015 | Asher et al. |
| 9,424,717 B2 | 8/2016 | Alexander |
| 9,824,543 B2 | 11/2017 | Alexander |
| 10,353,543 B2 | 7/2019 | Morrison et al. |
| 2002/0153656 A1 | 10/2002 | Maksymec et al. |
| 2004/0229671 A1 | 11/2004 | Stronach et al. |
| 2006/0038342 A1 | 2/2006 | Lomedico et al. |
| 2007/0026934 A1 | 2/2007 | Herbrich et al. |
| 2007/0054718 A1 | 3/2007 | Del Prado |
| 2007/0112706 A1 | 5/2007 | Herbrich et al. |
| 2007/0249420 A1 | 10/2007 | Randall |
| 2008/0102946 A1 | 5/2008 | Amour |
| 2009/0023495 A1 | 1/2009 | Koustas et al. |
| 2009/0026706 A1 | 1/2009 | St. Clair et al. |
| 2009/0054127 A1 | 2/2009 | Sweary et al. |
| 2009/0176560 A1 | 7/2009 | Herrmann et al. |
| 2009/0209233 A1 | 8/2009 | Morrison |
| 2009/0233575 A1 | 9/2009 | Morrison |
| 2009/0233633 A1 | 9/2009 | Morrison |
| 2010/0093431 A1 | 4/2010 | Kasiotakis |
| 2011/0014974 A1 | 1/2011 | Torf |
| 2011/0207524 A1 | 8/2011 | Simon |
| 2011/0306427 A1 | 12/2011 | Pawson |
| 2012/0086583 A1 | 4/2012 | Morrison |
| 2012/0115585 A1 | 5/2012 | Goldman et al. |
| 2012/0196625 A1 | 8/2012 | Morrison |
| 2012/0283858 A1 | 11/2012 | Lapadula |
| 2012/0289340 A1 | 11/2012 | Pawson |
| 2013/0178259 A1 | 7/2013 | Strause et al. |
| 2013/0178270 A1 | 7/2013 | Flaherty et al. |
| 2013/0337921 A1 | 12/2013 | Butz, Jr. et al. |
| 2014/0031105 A1 | 1/2014 | Givant |
| 2014/0309001 A1 | 10/2014 | Root |
| 2014/0342817 A1 | 11/2014 | Marantelli |
| 2015/0018082 A1 | 1/2015 | Kim |
| 2015/0352449 A1 | 12/2015 | Nangia |
| 2015/0360133 A1 | 12/2015 | MacCallum et al. |
| 2016/0210815 A1 | 7/2016 | Holt et al. |

OTHER PUBLICATIONS

Korean Intellectual Property Office Authorized Officer: Lee, Myung Jin, International Search Report; Written Opinion of the International Searching Authority; PCT/US2015/048970, 12 pages, dated Dec. 8, 2015.

DraftDayMedia, How to Play Daily Fantasy Sports—Rapid Fire Games, https://www.youtube.com/watch?v=BPF6bSsxnuc&feature=youtu.be, May 12, 2014.

DraftDay Fantasy Site Review, https://www.dailyfantasysports101.com/draftday, Sep. 15, 2016, 8 pages.

METHOD AND SYSTEM FOR PRESENTING AND OPERATING A SKILL-BASED ACTIVITY

PRIORITY

The present patent application is a continuation of U.S. patent application Ser. No. 17/509,766, filed on Oct. 25, 2021, which is a continuation of U.S. patent application Ser. No. 17/184,264, filed Feb. 24, 2021, now issued as U.S. Pat. No. 11,157,147, which is a continuation of U.S. patent application Ser. No. 16/502,169, filed Jul. 3, 2019, now issued as U.S. Pat. No. 11,042,264, which is a continuation of U.S. patent application Ser. No. 14/847,795 filed Sep. 8, 2015, now issued as U.S. Pat. No. 10,353,543, which application claims priority from U.S. provisional patent application Ser. No. 62/047,473, filed Sep. 8, 2014 and U.S. provisional patent application Ser. No. 62/106,613 filed on Jan. 22, 2015. Each of these applications is hereby incorporated herein, in its entirety, by reference.

TECHNICAL FIELD

The present invention relates to methods of presenting and playing skill-based fantasy-type gaming activities.

BACKGROUND ART

Sports wagering is a very popular activity because it increases fan interest and excitement in sports events. With a wager at stake, a fan's interest in the outcome of a sports event is heightened. Also, sports wagering increases a fan's interest in a sport as the fan tracks teams and players in an attempt to place wagers that they believe will be winning. Sports wagering both land-based and internet-based have been established to offers such services and depend on jurisdictional laws.

Sports wagering, however, is not legal in many locations. As a result, other types of activities have been created to increase fan interest and excitement associated with sporting events. As one example, fantasy sports have been created. These activities correlate the performance of players or sets of players involved in actual sports events to a non-wagering entertainment activity.

Skill-based games that allow a player to participate with real money purchases with resulting prizes based on the user's skill have become popular. Such games allow a user to engage in a skill where they compete and play against other users. Examples of such skill-based games include games such as Diamond Strike, poker, and fantasy sports leagues (e.g. baseball, football etc.).

In one implementation of a fantasy football league, a fan forms a fantasy football team comprised of a collection of individual players from a set of different football teams. For example, a fan might pick a quarterback from one football team, a running back from another football team, and so on, in order to create an imaginary or "fantasy" team comprising a collection of players who do not actually form a real team.

Generally, fans pit their fantasy teams against the fantasy teams of other fans usually over the course of professional football season. Commonly, fans pay an entry fee to participate in the fantasy activity and winnings are paid from a pool formed from the entry fees. The winner(s) of the fantasy activity may be determined in a number of fashions. In one common configuration, scores are assigned to each player based upon their performance in an actual game. A fan's fantasy team score then comprises the aggregate of the scores of each of the players on their team. The winner(s) of a particular fantasy activity are the fan(s) whose team(s) achieves the highest score. Winners may be paid at the end of each week of play or at the end of the season.

While fantasy sports activities are popular, there are several reasons why the popularity of such activities is limited. The primary drawback to participating in such fantasy sports activities is the time, effort and understanding of creating teams or selecting players involved in forming and managing a fantasy team. For example, a group of fans may form a fantasy sports pool. Initially, the fans draft or pick players to form their teams. The fans may pick players one at a time in order, in similar fashion to current actual player drafts. In some cases, fans of the same pool are not permitted to select the same players. Thus, each fan must carefully form a fantasy team by evaluating the best players still available when considering the prior picks of other fans. The process of picking the teams may take hours or days and involve spending large amounts of time evaluating available players to be picked. For example, a fan may spend a significant amount of time analyzing statistics, predicted performances, and many other factors for each potential player the fan might wish to draft. The fan might also take into account past performance of each player, the current health status of each player, and so on, to make draft selections.

When the fantasy activity spans multiple games, such as an entire season, a fan may adjust their fantasy player roster to address issues such as injury to the actual players, team matchups and other factors that may affect a player's performance. There are different variations of these types of fantasy team-type activities, each having their own rules. However, in general, participation in these activities is time consuming, often deterring fans from participating in the activities.

Other drawbacks may keep fans from participating in these activities. For example, with traditional fantasy sports activities, a fan must be ready to participate before a season of a particular sport begins, or else the fan risks being left out and must wait until the next season. Further, it may be difficult for a fan to join multiple leagues or to buy multiple entries from the same provider. Traditional fantasy sports may be difficult for a fan to play casually or a quickly as a fan might desire. Finally, from the perspective of an operator, it may be difficult to attract casual sports fans with traditional fantasy sports.

It is thus desirable to develop a new fantasy-sports type activity that overcomes the limitations of existing activities as previously described.

SUMMARY OF THE EMBODIMENTS

Embodiments of the invention comprise methods and systems for presenting fantasy sports related activities. The method and systems include at least one activity server system comprising a processor configured to execute machine-readable code. The machine-readable code executed by the processor is configured to cause the server to create a set of activity matchups. The matchups each include at least one participant of an event (e.g. a player in a professional sporting event). The server further transmits the set of matchups to a plurality of presentation devices (such as fans' mobile devices, computers, smart television, game consoles etc.)). The plurality of presentation devices is configured to display the set of matchups on a display for selection by a fan. The code executed by the processor also enables the server to receive selections of at least one matchup of the set of matchups from the fan, with the selection being input on one of the plurality of presentation devices. Typically, the fan will need to select a minimum number of matchups and winners for that matchup. The lower bound is generally three matchups with no limit on the upper bound with the exception of a restraint placed by the operator. The server further determines actual outcomes of the set of matchups and compares the outcomes with the selections received from the fan. If the fan has correctly selected the actual outcomes of the at least one matchup of the set of matchups from the fan, the server, based on a known payout table previously presented to the fan, then determines winning selections and then calculates the payoff amounts to the fan.

In a preferred embodiment, the matchups relate to sports events. The matchups may pair one or more players, wherein a fan attempts to pick the player(s) of the matchup who they believe will be the winner of the matchup. The winner of each matchup is preferably determined by performance criteria of the players in the actual sporting event(s). The performance criterion includes a set of predetermined rules and a methodology for scoring each participant according to performance statistics. The final determination of a players performance is determined by the calculation of a 'fantasy points score' where points awarded based on their game performance/statistics—i.e. touchdown +5 pts, Fumble −2 pts.

In accordance with the invention, a skill-based activity is created that increases the excitement of associated sports events or the like, while decreasing the time, effort, and coordination required to participate in the activity. Multiple games are presented to the fan along with the ability for the fan to utilize data from their 'fantasy team games' to further integrate with this 'system' or inventions by allowing the fan to match up their team roster with matchups in the system that are available—that either match their team players against the game system or other players in their fantasy game leagues. Further objects, features, and advantages of the present invention over the prior art will become apparent from the detailed description of the drawings that follows, when considered with the attached figures.

In certain embodiments of the invention, a user through a presentation device will access a remote activity server system. The user will download a platform that can be installed on the presentation device. The platform may include an application that provides for communication with the activity server system and the platform allows for determination whether a predetermined set of compliance criteria have been met prior to letting the user play a game that is associated with the platform. The user downloads one or more games from the activity server system on the presentation device. In one embodiment, the game is a skill-based game. The skill-based game application is configured to communicate with the platform to determine whether a set of compliance criteria have been satisfied. If the compliance criteria are deemed satisfied, the game application communicates with the activity server system. The activity server system may perform additional authentication and/or determine whether compliance criteria has been met. The activity server system will then serve game related data to the game application for presentation to the user, allowing the user to play the game. For example, the activity server system may serve a set of predetermined matchups.

Embodiments of the invention may further include a system for presenting a skill-based game. The system may include a non-transitory storage medium storing machine readable code and at least one activity server system comprising a processor configured to execute the machine readable code and to communicate over a wide area network to a plurality of presentation computing devices and to receive information from the plurality of presentation computing devices. The system may also include a device storage system coupled to the activity server system storing (i) information concerning a plurality of users, each user identifiable by a user account, (ii) event data pertinent to a set of events and participants in the set of events. The machine-readable code, when executed by the activity server system, causes performance of computer processes comprising:

serving over the wide area network a set of matchups of participants along with associated an fixed-payout table based on winning user matchup selections, to the presentation devices, so as to cause the presentation devices to display the set of matchups to the users;

receiving over the wide area network user roster data, from the presentation devices, characterizing a set of user-selected winners of the matchups made by the users;

updating the event data pertinent to participants in the actual events; and using the updated data to calculate and assign payoffs to the users based on the fixed payoff odds.

The system may also include machine-readable code that when executed by the activity server system, causes performance of computer processes further comprising:

in a matchup selection tool process, creating and modifying the set of matchups based on a plurality of participants, and transmitting the set of matchups to the server.

The matchup selection tool process may further include presenting information about the participants including expected fantasy points for each participant for an upcoming event.

In another embodiment of the invention, the machine-readable code, when executed by the activity server system, causes performance of computer processes further comprising:

in a risk assessment engine process:

determining a total possible payout based upon the user selected winners for a matchup;

comparing the total possible payout with a predetermined threshold; and if the total possible payout exceeds the threshold, eliminating the matchup from further play.

In a further embodiment of the invention, the received user roster data includes a user-selected hedge value by which a given user specifies a minimum number of a total number of matchup outcome selections made by the given user that must be correct in order for the given user to win.

Embodiments of the system may include a graduated payout table and the system may further include machine-readable code, when executed by the activity server system, causes performance of computer processes further comprising calculating the graduated payout table based on the fixed payoff odds and serving over the wide area network a set of matchups of participants along with associated fixed-payoff odds to the presentation devices further comprises serving the graduated payout table.

The embodiments of the invention also include a computer-based method for providing suggested athlete match-ups to a matchmaker organizing a skill-based game. The computer based method implemented by a server system performing computer processes comprising:

receiving by a server system schedule information about a plurality of games on a computing device from an information source containing the schedule information;

determining by the server system the athletes expected to compete in the plurality of games by accessing player information for each team;

ranking by the server system the athletes using historical fantasy point performance values for the athletes based at least upon a calculated expected fantasy point performance values to be scored by the athlete in a next game; and causing display by the server system in a graphical user interface identities of athletes according to their expected fantasy point performance values wherein the graphical user interface allows the matchmaker to select players to assign to a matchup.

Embodiments of the computer-based method may include ranking for each athlete wherein the computer processes further comprises:

providing by the server system a filter to the matchmaker for filtering relevant historical fantasy point performance values for the athlete from a set of historical fantasy point performance values based upon a criteria set;

predicting, based on the historical fantasy point performance values, by the server system an expected team fantasy point performance value for the team of the athlete for the same game; and determining, by the server system, the expected fantasy performance values of the athlete based on the filtered relevant historical fantasy points performance values weighted by the predicted team fantasy point performance value divided by a historical team fantasy point performance value.

The criteria set for filtering the relevant historical fantasy point performance values may include at least one of number of previous games played, duration of play within the games, algorithm selection, venue, and characteristic of at least one member of the opposing team. Additionally, the method step of determining the expected fantasy performance values of the athlete based on filtered relevant historical fantasy points performance values includes using the predicted team fantasy point performance value that has been filtered based on the criteria set.

The computer processes may further comprise, after determining the expected fantasy point performance values for the athletes, ordering the athletes according to expected fantasy point values. In certain embodiments, the athletes are filtered and displayed by expected fantasy point total according to position.

The computer-based method may also provide for allowing a matchmaker to review the list of athletes and expected fantasy point performance values and to select individual athletes to assign to a matchup and storing the assignment of athletes to the matchup in a matchup data store.

The described system may also include machine-readable code, when executed by the activity server system, causes performance of computer processes further comprising:

in a computer-based risk assessment engine process,
querying the data store to identify users matchup selections with a disproportionate number of users selecting one of two participants in a matchup;

when such a matchup with an disproportionate number of users selecting one of the two participants in a matchup has been identified, determining whether the number exceeds a first threshold;

if the number exceeds the first threshold, removing or modifying the matchup from the set of matchups for all subsequent requests for serving the set of matchups.

In certain embodiments of the invention, the machine-readable code, when executed by the activity server system, causes performance of computer processes further comprising:

if the number exceeds the first threshold, determining whether a potential payout exceeds a second threshold;

wherein removing the matchup from the set of matchups is subject to the further condition that the payout exceeds the second threshold.

In certain embodiments of the invention the machine-readable code, when executed by the activity server system, causes performance of computer processes further comprising:

monitoring electronic information sources about mentions of participants in the set of matchups and monitoring for keywords including the keyword "injury" and if a mention of a participant occurs on an electronic information and a keyboard is identified, producing a graphical alert to an operator, the graphical alert allowing the operator to remove one or more matchups.

BRIEF DESCRIPTION OF THE DRAWINGS

FIG. 2 shows an exemplary screen shot presented on a presentation device of a user showing a series of athlete matchups for selection by the user;

FIG. 3 shows an exemplary screen shot presented on a presentation device of a user, when the user has selected a particular matchup, so that the user can select an athlete;

FIG. 4 shows an exemplary screen shot presented to a user on the user's presentation device where statistics are presented for each of the athletes in a selected matchup;

FIG. 5 shows a next matchup presented to the user on the user's presentation device;

FIG. 6 shows a screen shot in which the computer code on the presentation device directs the user to select at least one more pick in order to complete a card;

FIG. 7 show screen shot of a next matchup in a set of 10 possible matchups presented to the user on the user's presentation device;

FIG. 8 is a screen shot of a summary screen that shows the user's selections for the matchups;

FIG. 9 shows a screen shot in which a user has elected to play at least the minimum number of matchups and can then select an amount to wager;

FIG. 10 shows an exemplary screen shoot of a confirmation pop-up that is generated on the user's presentation device confirming the user's wager;

FIG. 12 is a screen shot showing an illustrative welcome interface displayed on the device of the user when the user downloads and launches the application on their presentation device;

FIG. 13 is a screen shot showing an illustrative account creation screen, allowing a user to create an enter information about the user;

FIG. 14 is a screen shoot showing a user's account scree on the presentation device of the user;

DETAILED DESCRIPTION OF SPECIFIC EMBODIMENTS

Figure 1:
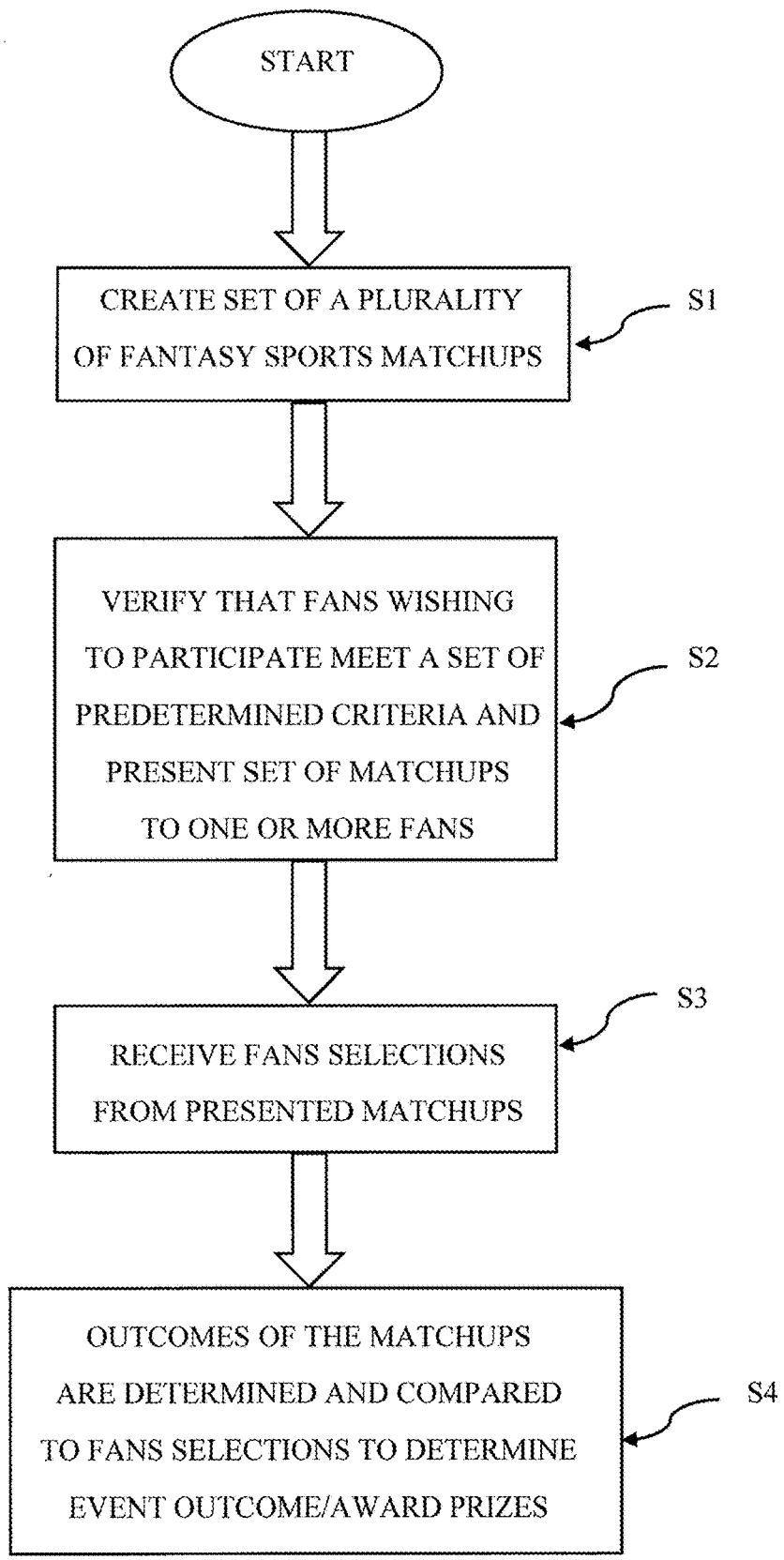
FIG. 1 is a flow chart that illustrates a method of presenting an activity to a fan according to an exemplary embodiment of the invention.

Definitions. As used in this description and the accompanying claims, the following terms shall have the meanings indicated, unless the context otherwise requires:

The term "fan" and "user" means an individual playing the "fantasy skill-based game".

The term "participant" refers to a "player" such as an "athlete" within an event (e.g. sporting event such as professional football or other event etc.) on which the fantasy skill-based game is based and the term may be used interchangeably with the term "athlete" and "player" where appropriate.

A "set" includes at least one member.

The term "skill-based game" shall mean a game that allows a user to use a skill such as the selection of participants based upon statistics and personal knowledge prior to occurrence of a set of events, such as sporting events, wherein, for the skill-based game, a determination will be made based upon a set of preexisting scoring rules for scoring the one or more of the participants based upon actual performance in the set of events. As used herein, the term "skill-based game" shall be understood to operate in a manner as to be exempt from regulation under provisions of the Unlawful Internet Gambling Enforcement Act of 2006 (UIGEA), 31 U.S.C. §§ 5361-5366, as a "fantasy or simulation sports game or educational game or contest in which (if the game or contest involves a team or teams) no fantasy or simulation sports team is based on the current membership of an actual team that is a member of an amateur or professional sports organization (as those terms are defined in section 3701 of title 28)" and that additionally meet the enumerated criteria of 31 U.S.C. § 5362(1)(E)(ix). Specifically, (I) All prizes and awards offered to winning participants are established and made known to the participants in advance of the game or contest and their value is not determined by the number of participants or the amount of any fees paid by those participants. (II) All winning outcomes reflect the relative knowledge and skill of the participants and are determined predominantly by accumulated statistical results of the performance of individuals (athletes in the case of sports events) in multiple real-world sporting or other events. (III) No winning outcome is based—(aa) on the score, point-spread, or any performance or performances of any single real-world team or any combination of such teams; or (bb) solely on any single performance of an individual athlete in any single real-world sporting or other event.".

The term "matchmaker" and "operator" may be used interchangeably to mean a person or group that operates the system for presenting the skill-based game to a user. In certain contexts, the matchmaker refers to a person or group of people that are skilled at determining matchups of players of equal sport skill that will likely produce similar fantasy points during a given game. The matchmaker may receive matchup suggestions from a matchup suggestion engine and may use a matchup tool for making the final assigned matchups. The operator of the system for presenting the skill-based game to the user, manages the activity server, the platform and the distributed computer application for playing the skill-based fantasy sports game.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise methods and systems for presenting skill-based, entertainment activities. In a preferred embodiment, those activities comprise fantasy-sports type activities.

In general, according to one embodiment of the invention, a plurality of fantasy sports "matchups" is generated. Each matchup pairs one or more components (e.g. players) against one or more different components. For example, in a preferred embodiment, each matchup may pair one or more first sports event participants against one or more second sports event participants.

A fan that enters the skill-based, sports-related entertainment activity is authenticated by a system before being authorized to participate. Authentication may include confirming the identity of the user and also include compliance with a set of compliance criteria. The compliance criteria may include such information as the age of the user and the location of the user (e.g. the state or locality in which the user is presently located). The compliance criteria may be configured to confirm that access to the game is in compliance with all local and federal laws. Once authenticated, the fan may determine a number of matchups to play (e.g., 4 through 10 matchups) and then pick either the first or second component(s) of each selected matchup. In the preferred embodiment, a fan thus selects a number of matchups and then picks either the first or second participant(s) of each selected matchup. Further, the fan may be required to select a minimum number of matchups. These matchups are selected by the fan prior to the participants undertaking their activity (e.g. playing in a professional sporting event). The set of selected matchups and the selected participants for winning the matchups shall be referred to as "user roster data".

The outcomes of the matchups are determined with reference to the first and second participants' actual performance in one or more actual sports event(s) according to a predetermined scoring criterion. For example in the preferred embodiment, the first or second participant(s) with better statistics in predetermined, weighted, statistical categories (e.g. a better fantasy sports score) in the one or more actual sporting event(s) may be determined as the "winner" of each matchup. The winners of the matchups are compared to the fan's picks. If the fan has made a sufficient number of winning picks, then the fan is declared to be a winner of the activity. Thus, the present invention requires a fixed payout table and each fan has an opportunity to win against—the system. This is in contrast to other games, such as pari-mutuel games, where fans play against other fans and payouts are based upon the amount of money that fans associate with their selections.

When the fan is a winner of an activity, the fan is awarded a prize according to a predetermined paytable. For example, the fan may win a cash, a reward, or other prize for correctly picking all of the selected matchups, or for correctly picking a predetermined number of matchups from the selected matchups (e.g. for getting "close").

One example of the invention will be described initially with reference to FIG. 1. In the example below, reference is made to a skill-based fantasy activity based on the actual game of football. However, it will be appreciated by a person of ordinary skill that the activity may be applied to any number of actual sports, games, or other competitions. In accordance with a first step S1, a set of fantasy matchups is created.

In a preferred embodiment, each matchup comprises a matchup of one or more sports event participants. As one example, a matchup may comprise a matchup of two football players relative to their participation in one or more football games that those players are playing in (the players may be playing in the same or different games). The matchups may match players based upon various criteria, such as playing position, etc. In one embodiment, the matchup may match two or more participants against two or more other participants. For example, a matchup might pit a first quarterback and running back pairing (the players may be on the same team or different teams and be playing the in the same or different games) against a second quarterback and running back pairing. Additionally, groups of more than two participants, such as three, four, or even more participants or players might be utilized in the matchups. Further, it is possible for the number of first participants in a matchup to be different than the number of second participants. For example, a matchup might pit a quarterback and a running back pairing against a second quarterback, a second running back, and wide receiver. In order for the fan to win, the fan must select the winning athlete of a match based on the fantasy points that are scored during an event. The fantasy point may include a handicap or biased value.

In accordance with a preferred embodiment of the present invention, the participants of each side of a matchup are preferably pre-selected in a manner that they are closely or evenly matched with reference to an expected outcome. The matchups may be predetermined by a professional odds-maker or an odds-maker in conjunction with an automated process based upon statistical analysis.

As described below, the advantage of having evenly matched participants in a given matchup is so that the activity, including the outcome thereof (e.g., whether the fan is a winner or loser), will require a significant amount of skill or knowledge from the fan. First, the fan will use their skill in attempting to pick those matchups, which may appear to be uneven, as the fan is more likely to select the winner of those matchups. As to selected matchups which appear to be even, skill is involved in the player attempting to predict the winner of the matchup (e.g. if the matchup is uneven, such as where a very good player is pitted against a very bad player, little skill is necessary in predicting the winner; but as to matchups which are very even, great skill is required to successfully select the winner (if the fan is to achieve a success rate of over 50% as would generally be expected for truly even matchups)).

In a preferred embodiment of the invention, multiple matchups are generated for presentation to one or more fans participating in the fantasy sports activity. The total number of matchups, which are generated, may vary and depend, for example, on the number of matchups, which a fan must select in order to participate in the activity. Preferably, however, the minimum number of matchups that the fan must select is a sub-set of the total number of matchups from which the fan may select. In this manner, part of the skill involved in the activity is the fan's determination of which matchups to play from the set of matchups that is presented to the fan.

Further, the matchups presented to the one or more fans, including the number of matchups presented, may vary during the course of the fantasy sports activity. For example, matchups that involve one or more participants that have already completed an actual game may be removed and be replaced with one or more matchups involving participants that will play an actual game in the future. Matchups may also be changed based on a number of other criteria including for example, an injury to a participant, game cancellations, and a number of times a particular matchup is selected by the fans, etc. For example, if a particular matchup is selected by a certain percentage of fans, it may become clear that this matchup is not considered to be an even match and therefore, this matchup may be removed from the list of available matchups.

In one preferred embodiment of the invention, 40 matchups are generated. Each matchup preferably uses different sets of participants (whereby each of the 40 matchups are different from one another). The set of matchups may be presented in a "card" type format (although the card may be virtual). As described below, different cards (or sets of matchups) may be generated and presented to fans, including at different times. Also, as further described below, the number of matchups on a card may be reduced or vary from time to time based on game, risk analysis, player injury or other factors effecting game play or rules. As previously stated, if a believed even pre-determined matchup becomes un-evenly matched because of either a real (e.g. injury) or perceived condition (e.g. a great majority of fans select one participant of a matchup), the matchup may be removed from the pool of matchups available for future fans selection.

As described below, the matchups may be generated in a number of ways. For example, a suggestion engine may use defined criteria to create a number of proposed matchups. The operator may use a matchup tool to create one or more final sets of matchups, such as by filtering and selecting final matchups from those generated by the suggestion engine or by generating other matchups.

In a second step S2 (see FIG. 1), a fan that wishes to participate in the fantasy sports activity is authenticated by a system before being authorized to play and then the set of matchups is presented for selection by one or more fans.

For example, certain authentication of the fan (their identity, location, age, etc.) may be performed in order to allow the fan to access the activity and their user account and/or in order to comply with local, state or federal requirements. As described below, the fan may use a mobile device, and the mobile device may be authenticated with the system. The selections may be presented to the fan via a graphical user interface on the fan's mobile device. Alternatively, the fan may also use a desktop computer, laptop computer or other processor-based device that can make network connections (e.g. connect with the Internet) or in other manners of participating in the fantasy sports activity.

Figure 2:
FIGS. 2-10 illustrate a sequence of a presenting or playing in an activity in accordance with an exemplary embodiment of the invention.
Figure 3:
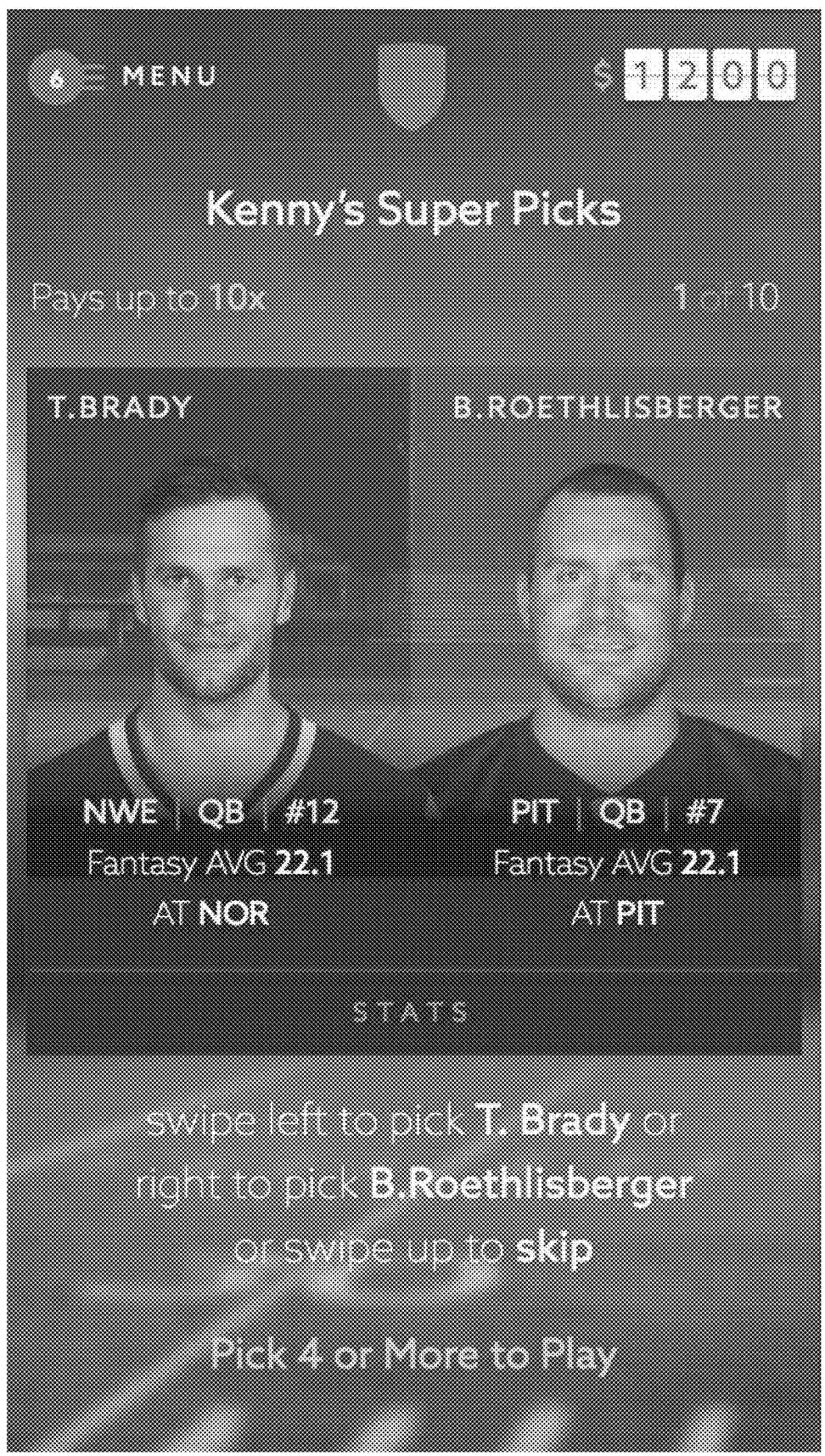
Figure 4:

Once a fan is authorized to participate in the activity, the set of matchups is presented to the fan. FIG. 2 illustrates one embodiment of a graphical user interface that may be used to present matchup information. In this example, the interface presents a plurality of matchups to the fan (the number of matchups and how they are illustrated may depend, for example, on the interface, including the screen size of the like). The matchups may be presented in a card or list format for quick reference or viewing by the fan. In addition, however, the fan may have the option of selecting one or more of the plurality of matchups to form a user-selected roster. Upon selection of a matchup, the interface may present or display the matchup in further detail, such as in an enlarged and more informative format. In this example as shown in FIG. 3, the illustrated matchup is between two players, T. Brady and B. Roethlisberger. Images of these players, their names, team affiliation, fantasy sports score and/or other information may be presented by the interface to the fan. The interface may also allow the fan to optionally view additional statistical information for each of the players in the matchup, as shown in FIG. 4. If a fan is permitted to select from multiple matchups, similar matchup image or detail information may be presented for each matchup.

Figure 5:
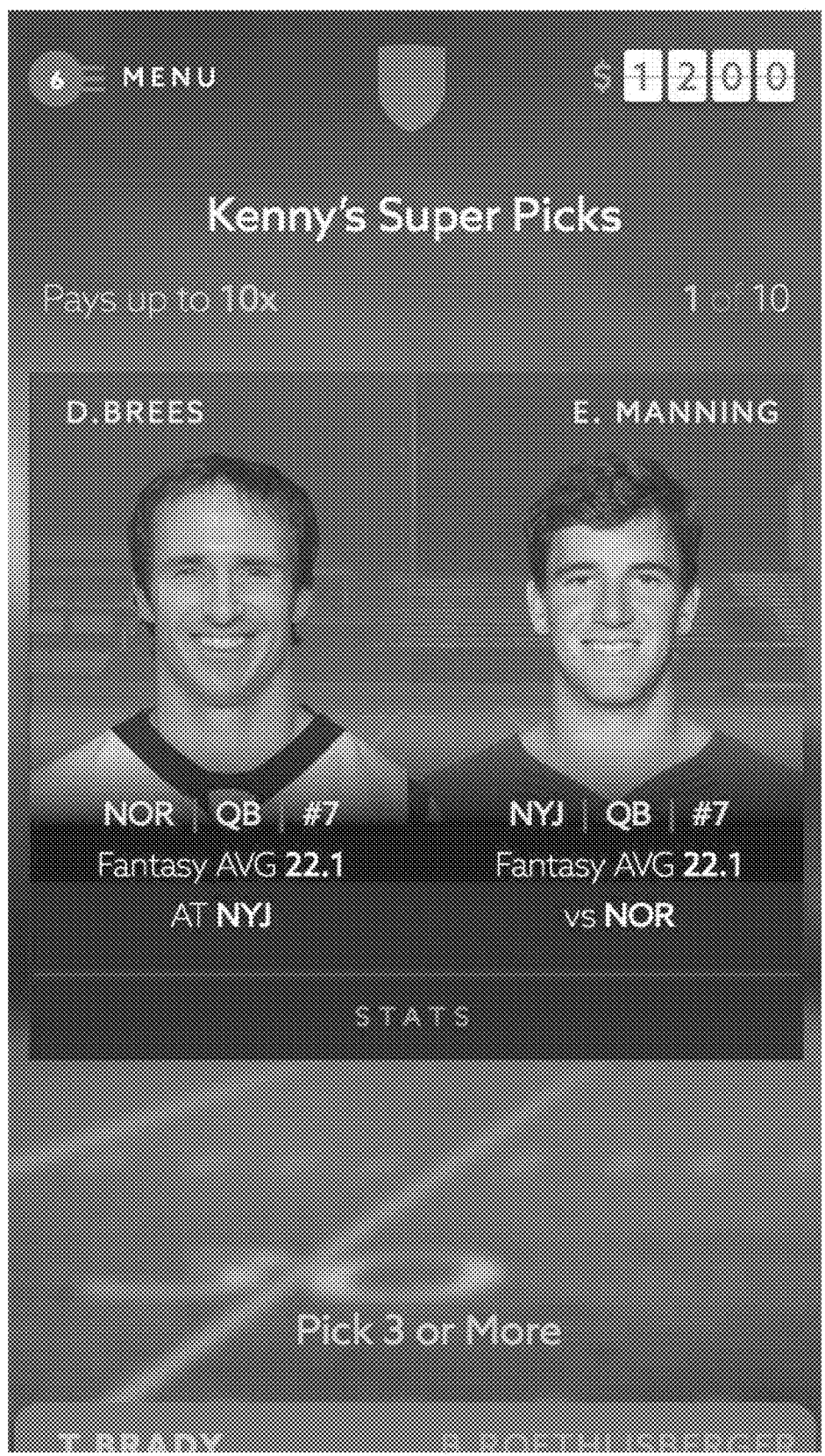

In one embodiment, the interface may present each matchup in a predetermined order. For example, as shown in FIG. 2, the fan may view the first matchup between T. Brady and B. Roethlisberger. The fan, based on his knowledge of each of the players in the matchup, may select the matchup by, for example, selecting one of the players in the matchup, or the fan may skip the matchup and select other matchups. Thereafter, the interface may present the next matchup as shown in FIG. 5, for example, between D. Brees and E. Manning. The fan may then select or skip this matchup, and so continue through each of the available matchups.

Thus, in accordance with one embodiment of the invention, a fan selects one or more matchups from the set of matchups. The fan then selects one of the components or elements of the matchup (e.g. the first participant or participants in the matchup or the second participant or participants in the matchup) as their selection for the predicted winner of the matchup. The fan's selections are received, as indicated in step S3 (see FIG. 1). For example, a fan may select matchups 1, 11, 14 and 34 out of forty possible presented matchups these selected matchups and the selected winners are the user's roster data. Relative to matchup 1, the fan might select the first participant (where that participant may comprise a single player or multiple players in the first position of that matchup). Relative to matchup 11, the fan might select the second participant (such as a single player or multiple players in the second position of that matchup). As indicated below, a fan's selection of matchups and selection of participants from those matchups may be received in various manners.

Figure 6:
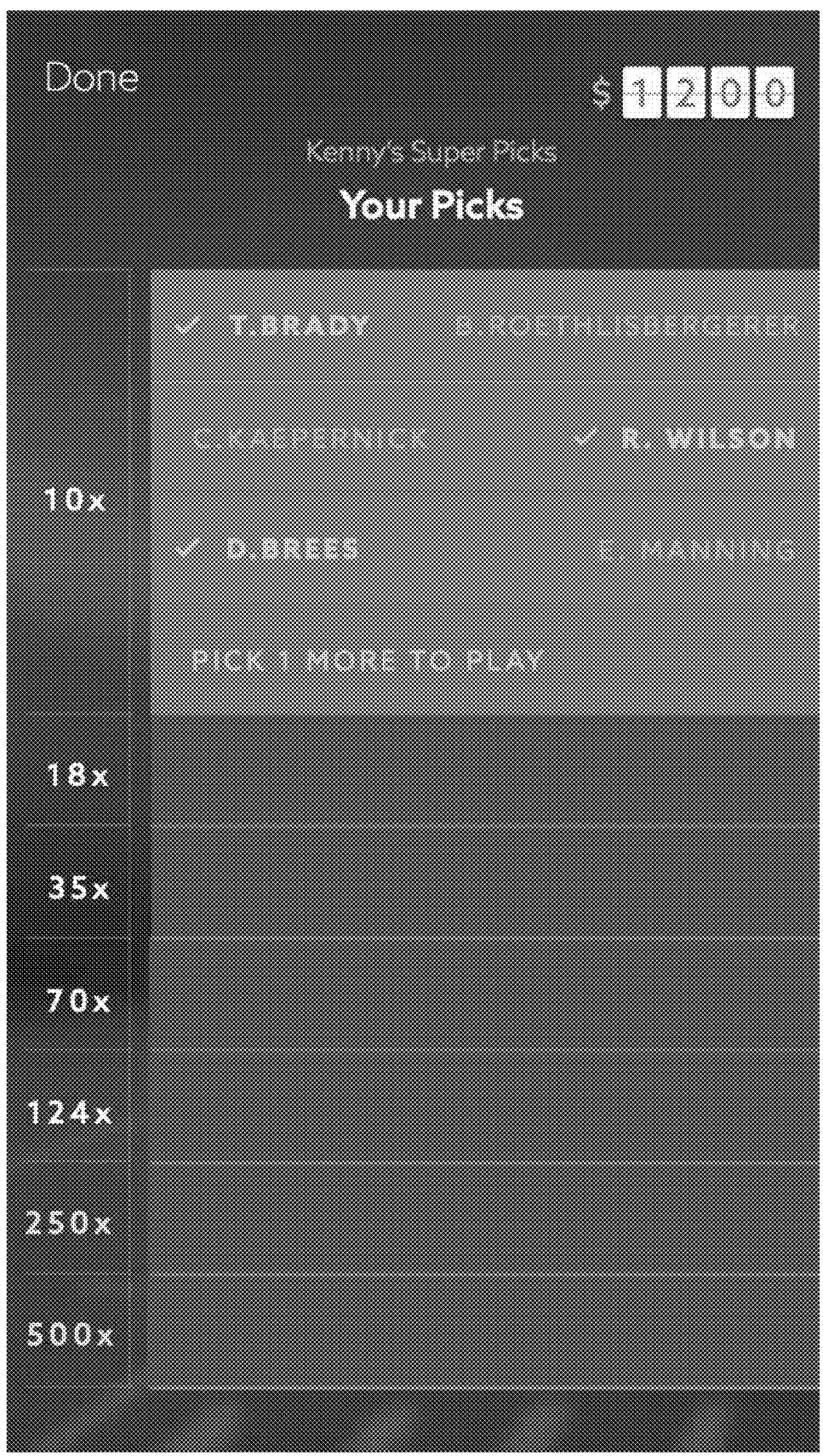

As indicated below, various information or interfaces may be used to display information to the fan regarding the matchups and selections. For example, after a fan makes a selection, a summary may be presented to the fan regarding the matchups they have elected to play and their selections. For example, after the fan elected to play the D. Brees/E. Manning matchup illustrated in FIG. 5 and selected D. Brees, a summary of that selection may be displayed with other elected matchups and selections, as illustrated in FIG. 6.

Figure 7:
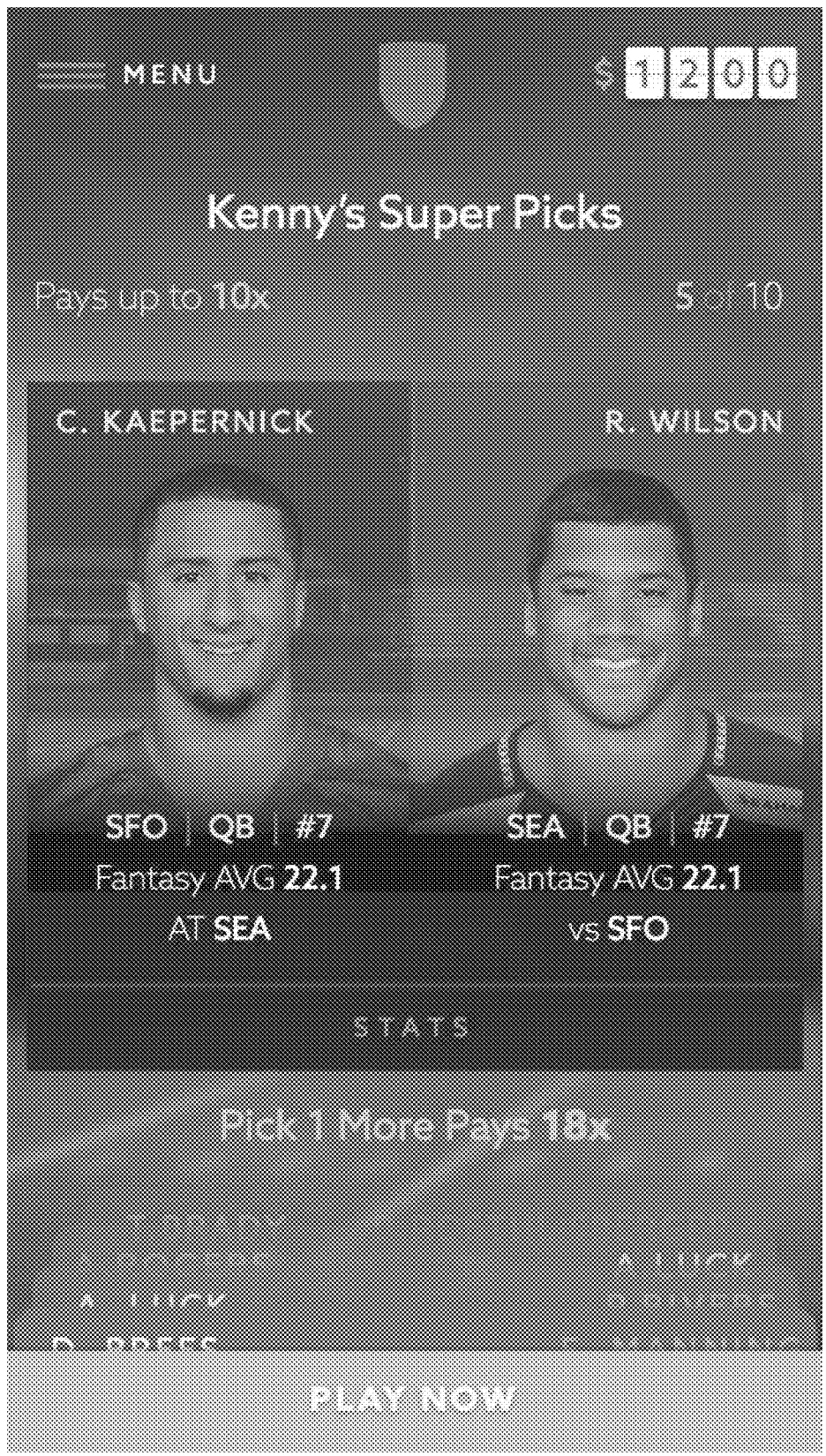

As described below, the fan may be required to play a minimum number of matchups from the set of presented matchups, such as four matchups of 40 presented matchups. In that event, the fan may also be notified of the number of additional matchups they must play to enter the activity. For example, where the minimum number of matchups that must be played by a fan is four and the fan has only elected three, the fan may be instructed that they must elect at least one additional matchup, as illustrated in FIG. 6. Thereafter, the fan may review the next matchup (as illustrated in FIG. 7) and elect to play that or other matchups. Again, as illustrated in FIG. 8, if the fan elects to play another matchup, it may be added to the summary.

Figure 8:
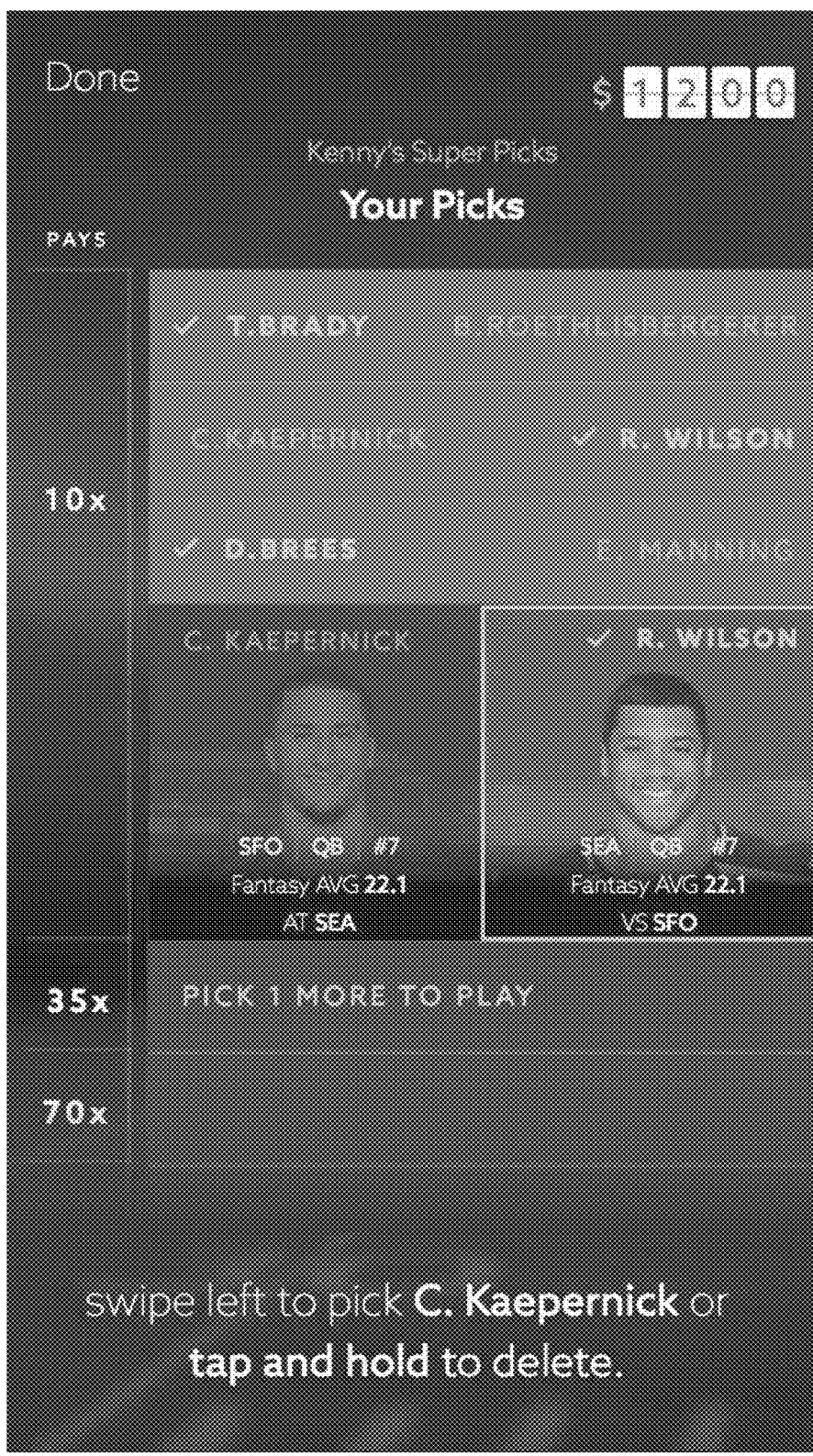
Figure 9:
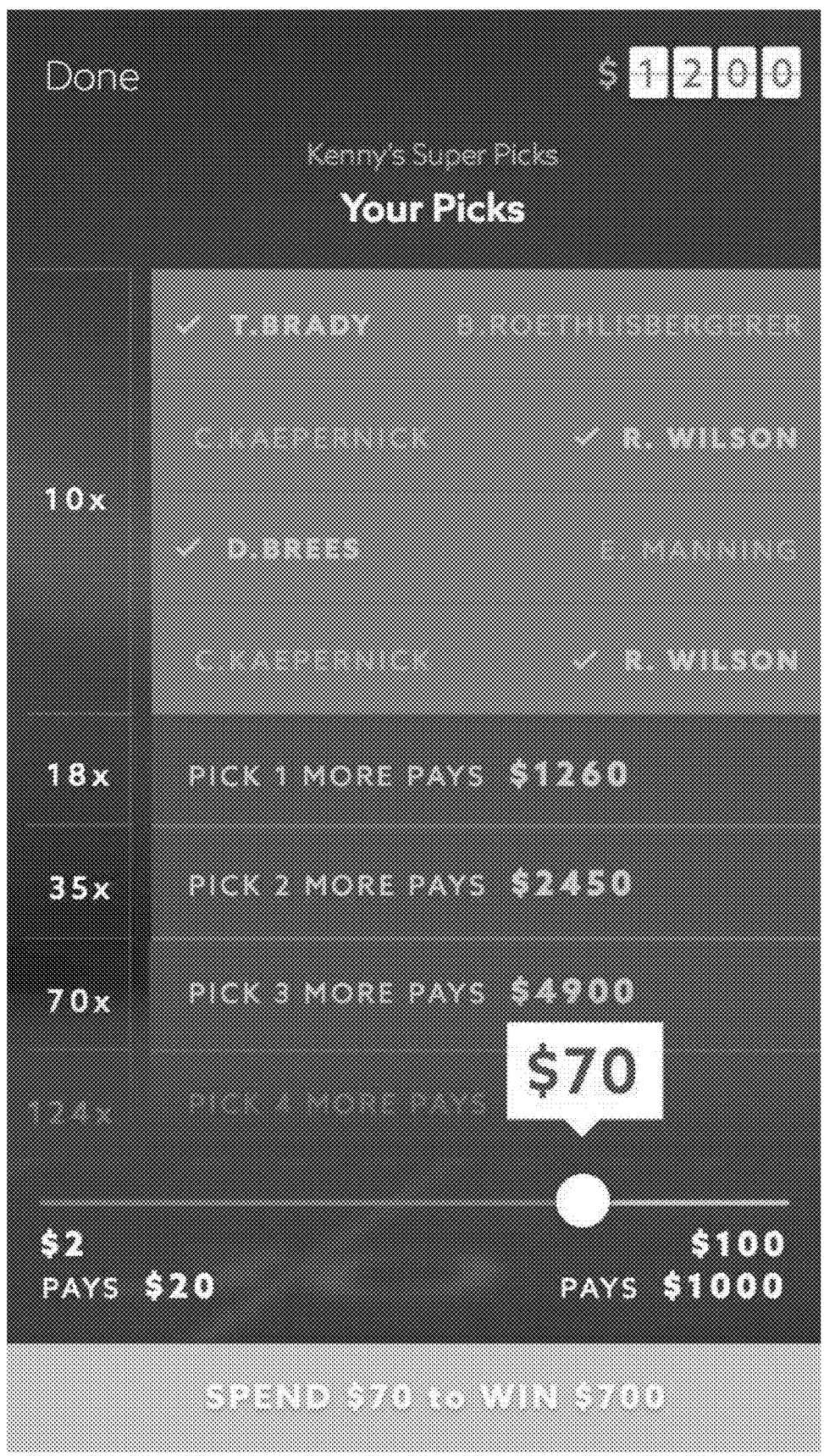

As also illustrated in FIG. 8, a summary of previous picks may be provided along with the current matchup and associated fan selection. Further, as illustrated in FIG. 9, once the fan has elected to play the minimum number of matchups to participate in the activity, the fan may be informed of the possibility of playing additional matchups. As illustrated in FIG. 9, the fan has been informed that they have played the minimum number of 4 matchups and would be entitled to a 10 times (10×) prize if they correctly predict the outcomes of the matchups, but the fan has also been informed that if they played one additional matchup, then they would be entitled to a prize of eighteen times (18×) if they correctly predict the outcomes of the matchups.

As described below, in a preferred embodiment of the invention, a fan is required to pay a fee to participate in the activity. In one embodiment, the fee may be based upon the number of cards that the fan plays. Further, the fan may be required to play a minimum number of matchups in order to be eligible for a prize. For example, a fan may be required to play a minimum number of four (4) matchups. The minimum number of matchups required may be set in advance by the operator and may also be changed by the operator. Depending upon the number of matchups that the fan plays and then the number of those matchups in which the fan correctly selects the winning outcome, the fan may be awarded a prize, such as based upon a prize table. The prize table may be presented in various fashions. FIG. 9 illustrates one embodiment of a graphical user interface in which prizes are displayed in relation to the number of matchups played by the fan, based upon the fan's entry fee. In all cases prize tables are presented so the fan knows in advance, what the prizes are prior to purchasing a 'roster' of user selected winners of matchups.

Figure 10:
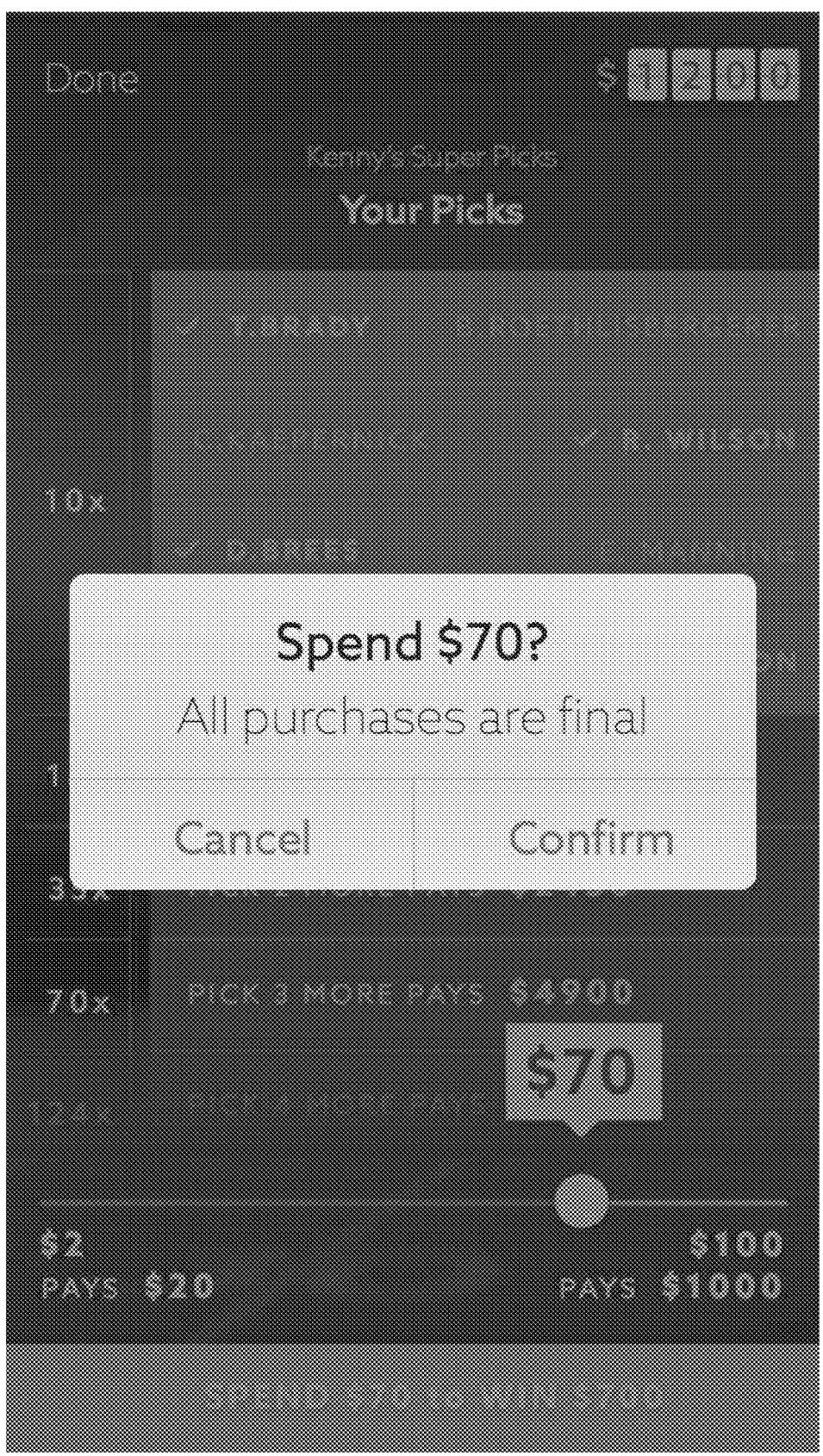

In one embodiment, there may be a minimum entry fee. There may also be a maximum entry fee, whereby the fan may select an entry fee for their card that is between the minimum and the maximum. As detailed herein, the prizes may depend on a number of criteria and may vary, such as varying based upon the amount of the fan's entry fee, the number of selected matchups or the like. In the example illustrated in FIG. 9, the fan has elected to pay a $70 entry fee and the potential prize winnings if the fan is a winner have been displayed ($700 if the fan elects to play the 4 selected matchups, or $1260 if the fan were to elect an additional matchup and play 5 matchups, etc.). The fan's selection of an entry fee may be input and confirmed in various manners, such as illustrated in FIGS. 9 and 10. In a preferred embodiment, the fan may be presented with a sliding selector, as shown in FIG. 9, which the fan may drag between a minimum and maximum entry fee to select his or her desired entry fee. The fan may drag the sliding selector using a touch screen on a mobile device, or other suitable input device. As shown in FIG. 10, the fan may be asked to confirm the desired entry fee prior to submitting his or her selections.

It is noted that the authentication process including compliance criteria described above may be repeated when the fan submits the entry fee. Thus, the location of the fan, a state of the device, and the like as described above can be verified not only at login, but at each time the fan pays an entry fee to participate in the fantasy sports activity. This includes authentication of the player information upon withdrawal of any winnings from their account balance. For example, there are presently two states that have an age requirement of 19 for a user/fan to participate in on-line fantasy sport games. The communication between the presentation device of the fan and the activity server system and the authentication process will be further described with respect to FIG. 13. In a step S4, the outcome of the matchups are determined and compared to the fan's selections to determine the outcome of the activity. In accordance with a preferred embodiment of the invention, scores are assigned to the participants of each matchup. In a preferred embodiment, those scores are based upon objective criteria, which relate to the relevant sports event and cannot be manipulated by the fan.

For example, relative to football players, each player may be assigned a score based upon the players statistics from their play in a football game using the following points schedule shown in Table 1 below:

TABLE 1

Example Fantasy Sports Scoring

Offense

| | |
|---|---|
| Passing Yards: | 1 point per 25 yards passing |
| Passing Touchdowns: | 4 points |
| Interceptions: | −2 points |
| Rushing Yards: | 1 point per 10 yards |
| Receiving Touchdowns: | 6 points |
| Receiving Yards: | 1 point per 10 yards |
| Receiving Touchdowns: | 6 points |
| Fumble Recovered for a Touchdown: | 6 points |
| 2-Point Conversions: | 2 points |
| Fumbles Lost: | −2 points |

Kicking

| | |
|---|---|
| PAT Made: | 1 point |
| FG Made (0-49 yards): | 3 points |
| FG Made (50+ yards): | 5 points |

Defense

| | |
|---|---|
| Sacks: | 1 point |
| Interceptions: | 2 points |
| Fumbles Recovered: | 2 points |
| Safeties: | 2 points |

TABLE 1-continued

Example Fantasy Sports Scoring

| | |
|---|---|
| Defensive Touchdowns: | 6 points |
| Kick and Punt Return Touchdowns: | 6 Points |
| Points Allowed (0): | 10 points |
| Points Allowed (1-6): | 7 points |
| Points Allowed (7-13): | 4 points |
| Points Allowed (14-20): | 1 point |
| Points Allowed (21-27): | 0 points |
| Points Allowed (28-34): | −1 points |
| Points Allowed (35+): | −4 points |

It should be understood by one of ordinary skill in the art that other fantasy point scoring systems may be used without deviating from the intended scope of the invention. Additionally, fantasy point scoring is not limited simply to football, but may be for any sport. For example, in the case of basketball fantasy scoring points may include the following: 3 pt basket equals 3 fantasy points, 2 pt basket equal 2 fantasy points, steal equal 1 fantasy point, rebound equal 1 fantasy point etc.

In the example fantasy sports scoring table above, fractional points may be awarded, the points may rounded to the nearest point, or the points may be truncated to obtain the final score for the player. Similar point schedules for other sports or events may also be used.

As one example, suppose one of the matchups selected by a fan pits quarterback A against wide receiver B. In this example, quarterback A participates in a game and has 275 yards passing, 2 passing touchdowns, 1 interception, and 1 fumble lost. Based on quarterback A's performance in the game, quarterback A is assigned a fantasy score. If the point schedule set forth in Table 1 is used, quarterback A scores 11 points for 275 yards passing, 8 points for 2 passing touchdowns, −2 points for 1 interception, and −2 points for 1 fumble lost. Thus, quarterback A's overall fantasy score is 15 for his performance in the game.

Next, suppose that wide receiver B participates in a game and has 130 receiving yards, 1 receiving touchdowns, and loses 1 fumble. Based on wide receiver B's performance in the game, wide receiver B is assigned a fantasy score. If the point schedule set forth in Table 1 is used, wide receiver B scores 13 points for 130 receiving yards, 6 points for 1 receiving touchdown, and −2 points for 1 fumble lost. Thus, wide receiver B's overall fantasy score is 17 for his performance in the game.

The fantasy scores of quarterback A and wide receiver B are then compared to determine the winner of the matchup. In the above example, quarterback A has a fantasy score of 15, while wide receiver B has a fantasy score of 17. Thus, wide receiver B would be declared the winner of the matchup.

Thus, each participant (or group of participants if group scoring is used) is assigned a score based upon their performance in the one or more relevant sports events. The scores of participants in a matchup are compared to one another, where the participant(s) with the highest score are declared the winner.

As explained previously, players in a matchup may not necessarily play in the same game. Thus, in the above example, the game in which quarterback A plays may be played at a different time than the game in which wide receiver B plays. Thus, the outcome of the matchup is not determined until after the completion of the game(s) in which the participants in the matchup play.

Once games for each of the participants in the selected matchups are complete, and the winners of each of the matchups are determined, those winners are compared to the fan's selections (user roster data). In one embodiment, a fan, based upon his or her ability to select matchups and judge the performance of the participants in the selected matchups, is required to correctly pick a certain number of winners of the matchups they have selected or played in order to be entitled to a prize.

For example, set forth below in Table 2 is an example prize table in accordance with one embodiment of the invention. As indicated in this table, if a fan elects to select or play four matchups and they pick the winner of all four matchups, then the fan is awarded an amount equal to 10 times (10x) the amount of their entry fee. On the other hand, if the fan elects to select or play five matchups and the fan picks the winner of all five matchups, then the fan is awarded an amount equal to 18 times (18x) the amount of their entry fee. While in one embodiment a fan may be required to correctly pick the winner of all of their selected matchups, other prize tables might award prizes when the fan picks the winner of some, but not all, of the selected matchups.

TABLE 2

Example Prize Table

| Matchups Played | Matchup Outcomes Correctly Predicted | Prize |
| --- | --- | --- |
| 4 | 4 | 10x Entry Fee |
| 5 | 5 | 18x Entry Fee |
| 6 | 6 | 35x Entry Fee |
| 7 | 7 | 70x Entry Fee |
| 8 | 8 | 125x Entry Fee |
| 9 | 9 | 250x Entry Fee |
| 10 | 10 | 500x Entry Fee |

Additional aspects of the invention will now be described. First, as one of ordinary skill will appreciate, the invention may be applied to any kind of event. For example, the invention may be applied to sports events such as football, baseball, basketball, soccer, rugby, hockey, horse or dog racing, automobile racing or any other type of competition (chess, ping-pong, bowling and so on). Further, the participants of the matchups can be players or other participants of those events, or groups of participants in those events.

The outcome of the matchup may be determined relative to one sports event or multiple sports events. For example, a matchup might pit quarterback A who is playing for team A in a game between teams A and B against quarterback C who is playing for team C in a game between teams C and D (e.g. the matchup need not be in relation to participants who are competing against one another in the same sports event). The matchup might relate to more than one sports event. For example, the matchup might pit quarterback A against quarterback B in relation to an entire season (whereby the outcome of the matchup is not known, and the outcome of the activity cannot be determined, until the season ends).

As also described in more detail below, while the matchup may pit one player against another player or one group of players against another group of players, other matchups may be utilized. For example, one matchup may challenge a fan to predict the performance of a single participant's ability to achieve a predetermined fantasy point total, as described below.

In one embodiment of the invention, the operator of the activity may require fans to enter the activity by a predetermined time. For example, matchups might pit NFL players against one another relative to weekly NFL games occurring between Thursday and Monday. The operator may thus require that fans enter the activity before the start of the first game on Thursday in order to participate in the activity, or at least before the first game involving one of the participants in the set of matchups that are being presented to the fan for selection. Thus, the computer-based system such as the activity server referred to below with respect to FIG. 15 will stop participation of an activity and will not accept entry into the activity if the user submits an entry of matchups electronically from the user's presentation device (presentation device of the fan 151 in FIG. 15).

In this regard, it is noted that the operator may present different sets of matchups to different fans. First, different sets of matchups might be presented at different times. For example, relative a weekly NFL schedule, a first set or card of 40 matchups, which includes participants playing in Thursday night football games, might be presented to fans before the Thursday night football games. However, after the Thursday night football games begin, a second set or card of 40 matchups may be presented to fans, which matchups include participants playing in Saturday, Sunday and Monday games. As a result, the activity server includes a clock mechanism and associates each of the matchups with time after which the matchup is no longer valid. The matchup suggestion engine 158 will remove the time barred matchups from the matchups being distributed to a fan's presentation device and may provide alternative matchups to the fan's presentation device that have not been time-barred.

In addition, matchups might be changed based upon participant injury or other factors. For example, a first set of matchups might include a matchup between players A and B. Once it is determined that player A is injured, that matchup may be removed from the card. For example, a risk assessment engine 159 in FIG. 15 can cancel matchups that have been previously selected by an operator and stored in a data store (predetermined matchups 165). These cancelled matchups will not be provided to the matchup suggestion engine 158 and will not be passed through to the presentation device of the fan. If a fan has already selected the matchup that is removed, the fan may be notified via, for example, a text message to his or her mobile device and/or email (e.g. the presentation device of the fan). The fan may then have the opportunity to update his or her selected matchups. The removed matchup might be replaced on the card with a new matchup, or fans might then be permitted to select from the remaining matchups on the card (e.g. at that point the card may only include 39 matchups).

In some cases, a matchup may need to be removed from a card after fans have already entered the activity. In one embodiment, if removal of one or more matchups causes the fan's selected matchups to number less than the minimum matchups in play, then the fan's card may be voided and the fan's entry fee may be refunded. The minimum number of matchups may vary depending on the sport or activity on which the fantasy game is based, but in general, the minimum number of matchups will be at least 3. However, if removal of one or more matchups causes the fan to still have at least the minimum number of matchups in play, then the card may be treated as having been played with that number of matchups originally. For example, a fan might select 5 matchups from a card of 40 matchups. As a result of cancellation of a game due to weather, one of the matchups the fan had selected was taken out of play, leaving the fan with 4 matchups in play. In that event, the results of those 4 matchups may be evaluated and the fan may be paid prizes based upon 4 matchups instead of the originally selected 5 matchups. Of course, other prizes might be awarded in such a situation (for example, in that situation, the fan might be awarded the prize based upon 5 matchups).

As indicated, in order to ensure that the result or outcome of correctly picking the result of a matchup requires a substantial amount of skill from the fan, each matchup is preferably generated so that the pairings are generally equal or equally weighted, such as pairing equally matched players. In other words, players with similar skill or ability to play the sports event are preferably matched in the matchups. Further, to add more excitement to the fantasy sports activity for the fan, it is preferable that well-known or popular players are included in the matchups.

One embodiment of the invention comprises a matchup tool that assists in the creation of the matchups. This matchup tool (see 163 in FIG. 15) aids an operator in generating matchups and is part of the game creation and management system. For example, the matchup tool 163 may aid the operator in creating matchups by providing information that would lead to the creation of matchups to the operator between players or groups of players where the expected outcome of the matchup is nearly equal.

For example, the matchup tool 163 may compare available player fantasy scores, player statistics, power rankings, and other available metrics to determine a suggested matchup between two evenly ranked players. As indicated, in one example of the invention, the outcome of a matchup is determined by a performance score assigned to the players in the matchup (which performance score is determined by each player's performance during a sports event). As such, the matchup tool may look at historical scores for those players as a guide to project the probable scores of those players in a new matchup. Other factors might also be considered that may modify the predicted score of the player(s). These other factors affecting a player's projected performance (such as fantasy score for the upcoming week) may include the location of the game being played (e.g. whether a player is on a home or an away team), forecasted weather, strength of the scheduled opponent, injuries to teammates, and other information about a player as may be available in various published news feeds. The matchup tool may further weigh player popularity to suggest matchups using the most popular players to the operator.

As one example, Player A might have a historical score average of 10.6 and Player B might have a historical score average of 10.7. However, in the next round of games, Player A might be playing a very strong opponent in bad weather and Player B might be playing an easy opponent in good weather, thus causing the expected scores to be adjusted, such as to Player A of 8 and Player B of 12. In such a case, this matchup may be viewed as sufficiently unequal that it is not used.

In one embodiment, the matchup tool may specify a plurality of matchups of individual player-pair suggestions or paired groupings of players that the operator may choose from in order to reduce the risk of the operator manually specifying unbalanced matchups. Further, the matchup tool may help to speed up matchup selection by the operator.

The matchup tool may include or use stored information (see 161 below in FIG. 15), such as information regarding players (including name, performance data, team data, etc.), sports event information (such as location of games, dates, team matchups) and the like in order to generate proposed matchups. The matchup tool 163 may generate a large number of matchups and then, based upon certain criteria such as a maximum score or value spread, eliminate generated matchups from being presented to the operator for selection (i.e. the matchup tool may generate a large number of matchup permutations and then remove those that are outside of certain baseline criteria). The operator might then select one or more sets of matchups from those generated by the matchup tool wherein the selected matchups are stored in a memory location (see FIG. 15 165).

Figure 18:
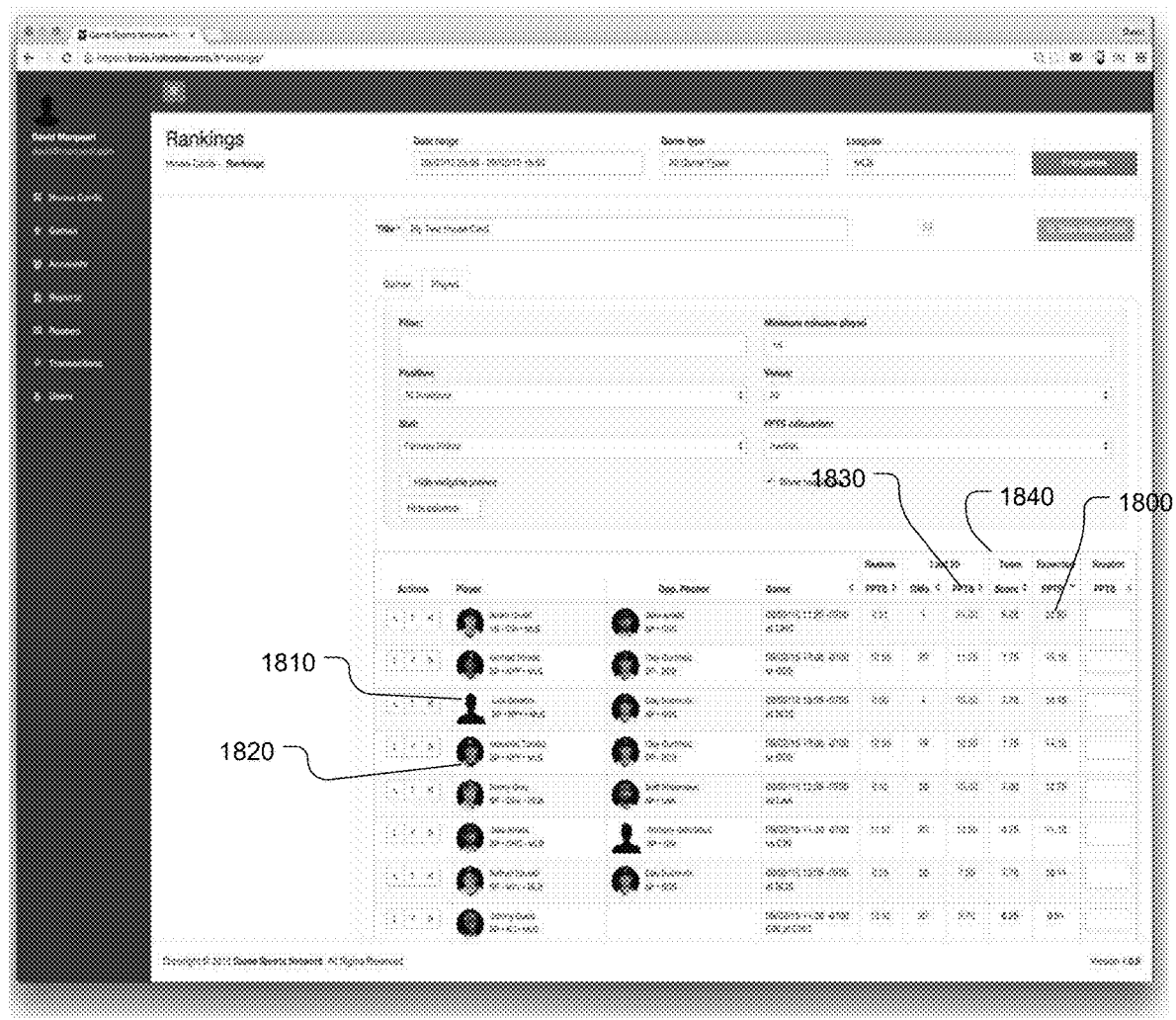
FIG. 18 shows an exemplary screen shot of the matchup tool sorted by player wherein a match maker can select a to add a player to a match and can view both historical and expected fantasy points for the player.

The matchup tool 163 further enables the operator to ensure balanced matchups in the matchup pairings. The matchup tool interface provides a list of potential matchup candidate players as shown in FIG. 18. The interface may include a graphical representation of each of the listed candidate players. For each candidate player, the interface may provide visual comparisons of past fantasy performances, statistics, next opponent, and other parameters to aid the operator in selecting evenly balanced matchups. The interface provides means for the operator to quickly organize candidate players into matchups. For example, when implemented on a desktop or laptop computer, a mobile device, or the like, the operator may select and a drag candidate players into matchup positions. Using the matchup tool, the operator may select and finalize each of the matchups to be presented to the fan.

Figure 16:
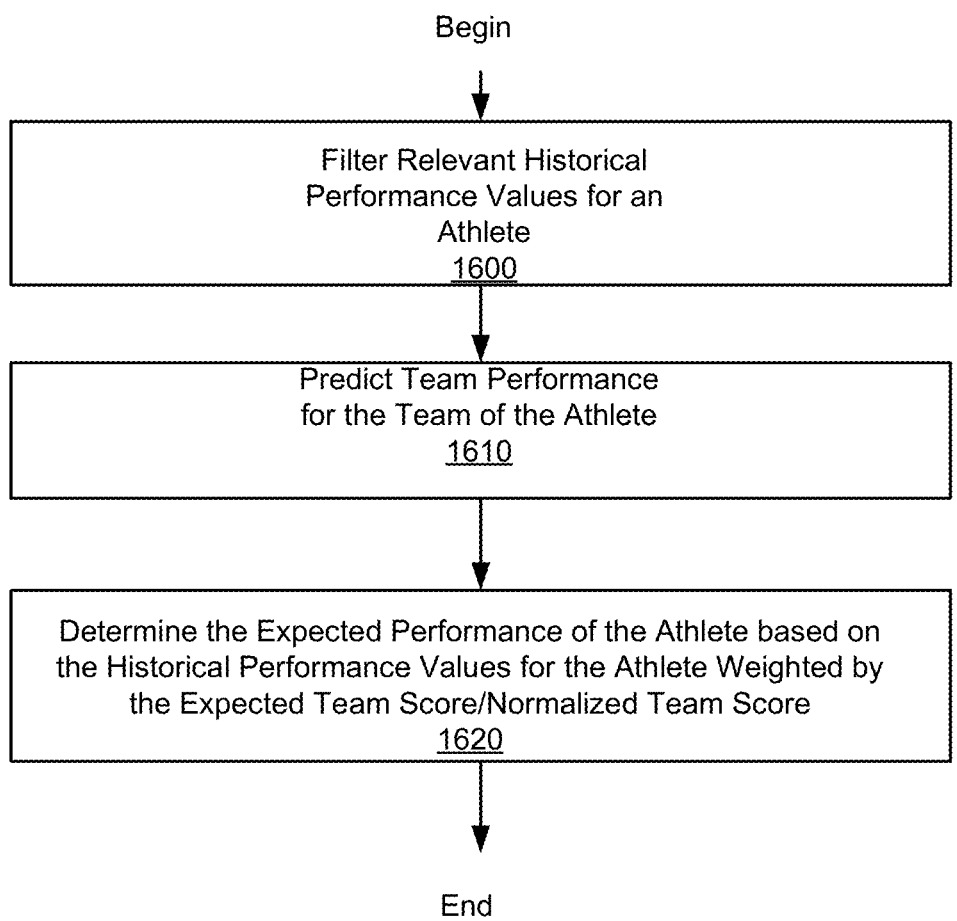
FIG. 16 is a flow chart describing how the matchup tool and player ranking tool determine the expected performance for each athlete playing within a game from which matchups are selected.
Figure 17:
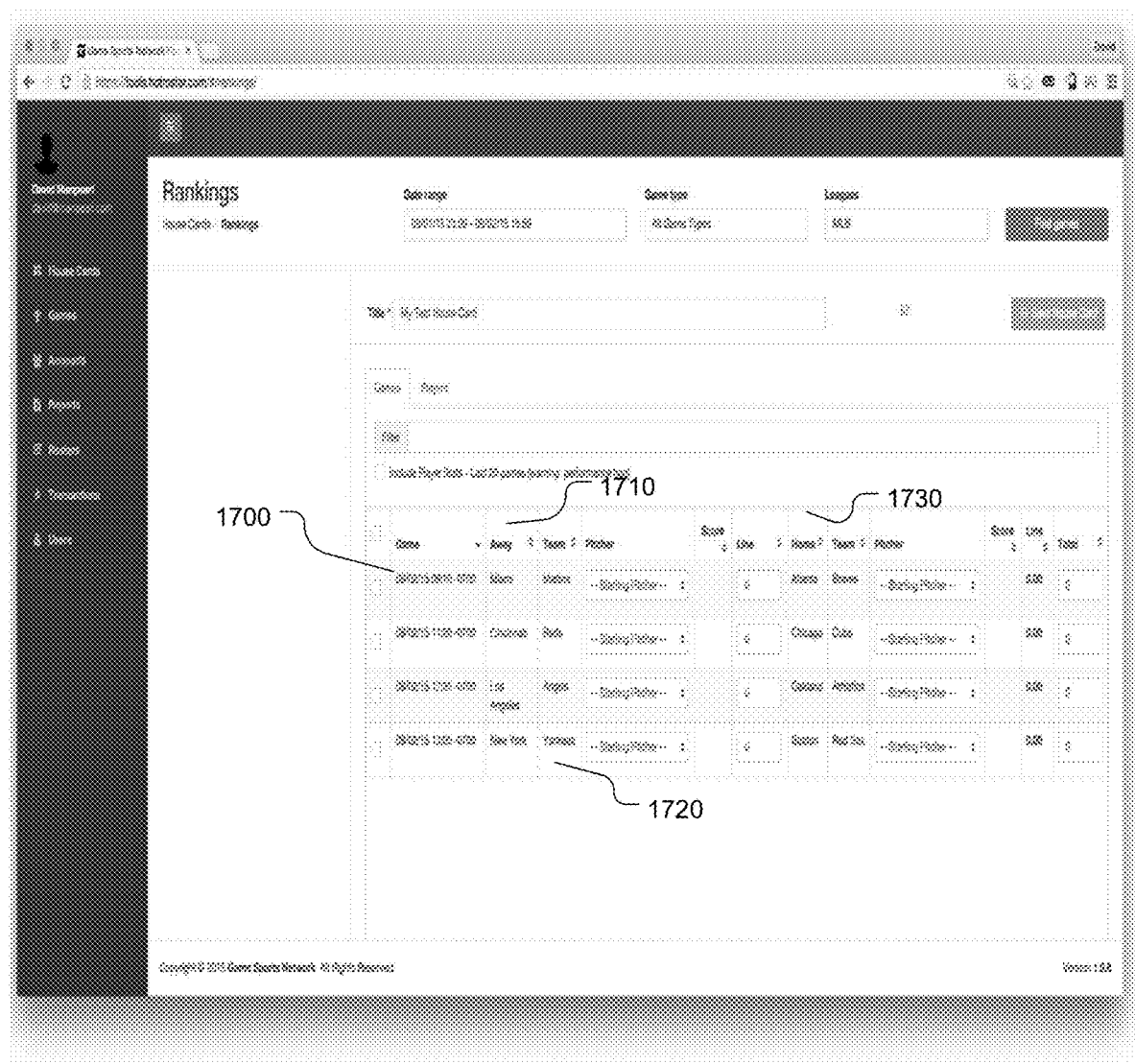
FIG. 17 is an exemplary screen shot of a the matchup tool graphical user interface that is presented to an operator that shows upcoming games along with related information about the games.

The system may also include a player-ranking tool as shown in FIGS. 17 and 18 that may be part of the matchup tool. FIG. 17 shows an exemplary screen shot of the matchup tool where the matchmaker selects a set of games over a period of time for making matches. The games are displayed in a column 1700 and the graphical user interface indicates the home 1730 and away 1710 teams and may provide other information such as the team name 1720. The matchmaker may then request display of the players for the selected games as shown in FIG. 18 The player-ranking tool may rank each player according to an expected fantasy point total 1800 that is composed of historical performance 1830 and predicted game performance. The player-ranking tool operates according to the following methodology as shown in FIG. 16. First, the historical performance values are filtered in accordance with the preferences of the operator to determine a historical fantasy point total for the athlete (i.e. player) being evaluated 1600. The filtering of the historical data may be based upon a number of factors including duration. The fantasy point total may be an average of fantasy points for a previous number of games (e.g. 20, 5, 2 etc.). Another filter that may be applied is a selection of an algorithm for calculating the fantasy points total. In one embodiment, a median algorithm is used to remove skew from statistical outliers. In another embodiment, an average algorithm is used. Another filter may be based upon a threshold condition. The fantasy points for a player may be limited to games in which the player played a minimum number of minutes or a percentage of the game (e.g. 60%, 70% etc.). The historical fantasy points may also be filtered according to venue so that average or median fantasy points over a set of games are based on whether the games are played at home or away. The historical fantasy points may also be filtered according to the opposition. For example, in baseball the historical information for a player, can be filtered in accordance with the pitcher handedness, such that the player's performance versus a right or left handed pitcher may be evaluated. This is especially useful in making matchups for upcoming games in which the opposing pitcher is known and therefore the handedness of the pitcher can be taken into account. Each of these factors affects the historical performance numbers.

The player-rating is then adjusted based upon the expected fantasy points for the upcoming game so that the player-rating is a composite of the historical fantasy points rating (average/median per game) and the expected fantasy points for an upcoming game. The expected fantasy points for a player may be calculated based upon the expected team performance for that same game 1610. The algorithm assumes a strong correlation between the performance of a player and that of the team. For example, if an NBA team is expected to score 10% more team points than usual, the methodology assumes that the individual player will score 10% more points and therefore, will have 10% more fantasy points than the historical average/median for that player.

In order to calculate the expected fantasy points, the calculated historical fantasy points are weighted by the athlete's predicted team score (see 1840 in FIG. 18) divided by the historical team score 1620.

$$FPTS_{expected} = FPTS_{historical}\left[\frac{TeamScore_{expected}}{TeamScore_{historical}}\right]$$

One method for calculating the expected team score begins with the published Las Vegas Totals and Point Spreads. For example, if the bookmaker odds predict that 200 points will be scored in an NBA game and that the Point Spread is −6 points for the athlete's team, then the expected team score for our athlete is [200−(−6)] *0.5=103

$$TeamScore_{expected} = \left[\frac{GameScore_{total} - PointSpread}{2}\right] = \left[\frac{200 - (-6)}{2}\right] = 103$$

Total game score and point spread are either entered into the system by the operators, or they are imported from a bookmaking site or API. The historical team score is also calculated. There are several ways to calculate the historical team score. In one embodiment, the average of all expected team scores for all of the players in the player ranking tool list of players. Preferably, the Historical Team Score is calculated from the same set of games that are used to calculate the athlete's fantasy points in the column for last 20 games played.

The above-described methodology for the player-ranking tool provides a matchmaker with a list of players ordered as closely as possible to their game day performances. Thus, in this embodiment, the Player-Ranking Tool allows match makers to create matchups quickly and easily. As shown in FIG. 18, players 1810 and 1820 both have expected fantasy points of 14.15 and thus, would make a good matchup. As an adjunct, the player-ranking tool can also be used for warning the matchmakers when creating an unevenly matched matchup and presenting suggested matchup cards to the matchmaker. The player-ranking tool is designed to assist the matchmaker in making matches and removing matches from play. Thus, the matchmaker can overrule any suggestions from the player-ranking tool.

Other types of activities may be offered in accordance with the invention. One type of activity is a round-robin activity. When considering a set of matchups, a fan might feel particularly confident about a certain set of matchups. For example, a fan might like 5 particular matchups and thus the fan might play a card of all 5 matchups.

In accordance with the invention, however, the fan might be offered the chance to still be a winner of the activity if the fan only correctly selects the winner of 4 of the 5 matchups.

For example, the fan may be offered "insurance" against one wrong pick, such that the fan still wins a prize if they pick any combination of 4 of the 5 matchups correctly. The fan may be required to place an additional entry fee (or insurance fee) to play the activity this way and the prizes may be less. For example, if a fan correctly picks the winners of all 5 matchups, the fan might be paid a prize of 18× their entry fee, but if the fan only picks 4 of the 5 winners, then they might only be paid a lower prize based upon their entry fee (or insurance fee). This feature may automatically be implemented, whereby when a fan elects a "pick 4 of 5" option, the system is configured to evaluate all combinations of the various matchup results to determine if any combination of 4 of the fan's 5 selections were correct. Of course, other options might be provided, such as a "pick 3 of 5", "pick 5 of 6" or other combinations of matchups.

Figure 15:
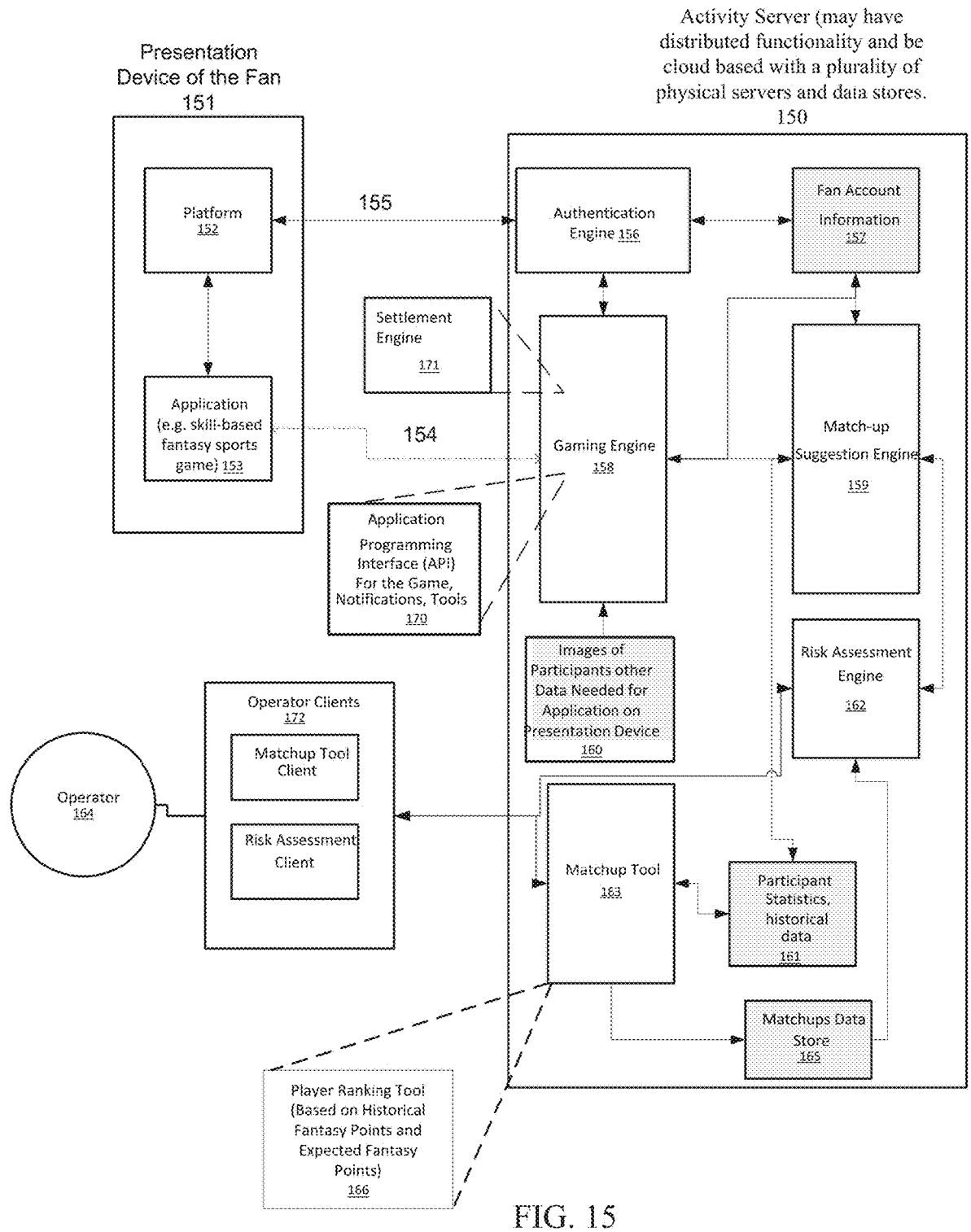
FIG. 15 shows an environment for implementing the invention including an activity server system and various components.

As indicated above, in one embodiment matchups may be presented by the gaming engine 158 (see FIG. 15) where the fan simply attempts to correctly pick the winner of the matchup based upon even or head-to-head scoring. However, in other embodiments, the matchups could include a "spread" or offset which attempts to equalize the outcome of the matchup. For example, the matchup suggestion engine might predict a fantasy score of 10 for Player A and 12 for Player B. A matchup might thus be generated as "Player A" vs. "Player B—2" by the matchup suggestions engine 159 as shown in FIG. 15.

In one embodiment, the fan may be challenged to project the performance of a single participant's ability to achieve a predetermined fantasy point total. Here, the components or elements of the matchup might be generated as an "over" or "under" selection. For example, Player A might be predicted to achieve a fantasy score of 14 points in his next game. A matchup might be presented as "Player A Under 14" vs. "Player A Over 14", whereby the fan must attempt to predict whether Player A will score over or under the identified score.

In another game variation, an entire subset of a team could be treated as an athlete. For example, football special teams may be compared against one another wherein the total fantasy points for one special team may be compared against the fantasy points of a second special team. Other team subsets could also be combined together, for example, the forwards for a first basketball team could be matched against the forwards for a second basketball team.

In yet another game variation, splits may be added wherein fantasy points are only collected during a subset of an entire game. The subsets could be based on boundaries such as periods, quarters, halves etc. Each side of a matchup could have a different split. For example: Split matchup for first quarter example: "T. Brady QB in Q1 vs R. Wilson QB in Q1". Split matchup for one athlete example: "T. Brady QB in H1 vs T. Brady QB in H2". Split matchup with point spread: "T. Brady QB −2.5 in Q4 vs R. Wilson QB +2.5 in Q4".

Additionally, the fantasy point calculations may be according to standard practices or may vary in accordance with that of the operator. Alternative point scoring (APS) totals may be used for matchups. For example:

APS matchup "T. Brady QB FPTS from Rushing Yards vs R. Wilson QB FPTS from Rushing Yards".

APS with point spread example: "T. Brady QB FPTS from Rushing Yards +5.5 vs R. Wilson QB FPTS from Rushing Yards −5.5".

APS for players on same team example: "T. Brady QB FPTS from Passing Yards vs R. Gronkowski TE FPTS from Receiving Yards".

APS with DST, point spread, and splits example: "NE DST FPTS from Sacks in H1 +1.5 vs SEA DST FPTS from Sacks in H1 −1.5".

APS with totals example for T. Brady QB FPTS from Passing Yards: "Greater Than 14.5 FPTS vs Less Than 14.5 FPTS".

In another variation, there may be multi-player matchups. A multi-player matchup introduces a matchup in which either or both sides are made up of several athletes whose fantasy points are summed together for comparison with the fantasy points of the other side. Each side of a multi-matchup can have different numbers of athletes.

An Example Multi-Matchup would be: "T. Brady QB, R. Gronkowski TE, NE DST (Defensive Special Teams) vs R. Wilson QB, L. Willson TE, S. Hauschka K, SEA DST (Defensive Special Teams)"

As indicated above, an advantage of the invention is that the determination of whether the fan is a winner or loser is based solely upon the fan's selections and not those of other fans. In some wagering and non-wagering events, the winner or winners of the events are determined by comparing the player's results. For example, in some existing games or events, a prize might be awarded to the one or more players who correctly predict the most winners of a set of events. In this situation, a determination of whether a player wins or loses the event is not determined solely by how many winners that player predicts, but also how many winners other players correctly predict. On the other hand, in accordance with the present invention, the determination of whether the fan is a winner or loser is measured solely by the fan's selections. The present activity is not pari-mutuel in nature. Pari-mutuel activities have the significant drawback that the size of the prize that is awarded to a winner is determined by the size of the prize pool and the number of winners. For example, in a pari-mutuel event, if only 2 players entered and each paid a $1 entry fee, then the maximum prize award would be $2. Further, the size of the winning prize is based upon the number of winners. For example, an event might indicate that a participant is a winner if they select 3 correct outcomes. However, 20 participants might all select all 3 correct outcomes, such that there are 20 winners. If the prize pool was $100, each of those 20 winners would then only be awarded $100/20, or $5. Contrary to this common prize award configuration, in accordance with the present invention a fan is paid a fixed prize if they achieve winning criteria (e.g. the size of the prize does not vary, such as based upon whether other fans also met the winning criteria).

Another difference between the present invention and a pari-mutuel type event is the exposure to the operator. In a pari-mutuel event, the maximum exposure to the operator is limited because the prize pool is fixed (e.g. the number of winners only changes each winner's share of the prize pool and does not increase the size of the pool or amount that the operator must pay out). However, in accordance with the invention, the amount of prizes that the operator must pay out increases as the number of winning fans increases. Thus, a risk assessment engine is used to aid in ensuring that: (1) matchups or combinations thereof are generally equal in weight and (2) that entry fees for the play of matchups, which are being selected unequally, are reduced or eliminated. Risk assessment is based on monitoring the ration of potential payouts at any given time to the correlation of those payouts.

In accordance with one embodiment of the invention, certain matchups or cards may be removed from play based upon an evaluation of the real-time receipt of entries from fans. Evaluation of risk and removal of matchups occurs in the risk assessment engine 162 (FIG. 15). For example, a card may offer 40 matchups. The first 100 entries received from fans may all include the selection of matchups 1, 17 and 20, where each fan has selected player A as the predicted winner of the matchup. In that event, the risk engine may determine that the operator may have a high risk of loss/payout (given the paytable of prizes), that the card or at least matchups 1, 17 and/or 20 should be removed. Likewise, the risk assessment engine might determine that in certain matchups the number of fans who are selecting opposing participant is nearly equal, but the aggregate fees of the fans selecting certain participants is much higher than for the other participant. Again, in view of this skewed activity, the risk assessment engine 162 may determine that certain cards or matchups should be removed from further play. For example, out of a card of 40 matchups, 200 players might select the first participant for each of matchups 1, 8, 9 and 22 and 200 players might select the second participant for each of those same matchups. However, the 200 players selecting the first participant might have collectively paid entry fees of $2000, while the other 200 players selecting the second participant in those matchups might have paid entry fees of $20,000. In this substantially uneven distribution of fees, the risk engine might remove the card or matchups 1, 8, 9 and 22 from that card. Preferably, the risk assessment engine 162 evaluates entries by fans on a real time basis, collating and collecting the matchup selections and fees to thereby constantly analyze the weighting of selections and fees. Thresholds may be programmed or set in the risk engine so that the risk engine automatically makes matchup or card adjustments when thresholds are hit, such as to protect the operator from unjustifiably high risks of loss.

The risk assessment engine 162 may include a graphical user interface 169 (see FIG. 15A) that allows an operator to view a listing of correlated roster payouts (wherein a roster is the selection by a user of a pre-defined number of matchups and selected winners for those matchups) and roster counts ordered by potential payout amount to determine the riskiest combinations, which would be presented at the top of a listing in the graphical user interface. As indicated above the risk assessment engine GUI 169 may be local to the risk assessment engine 162 or a client application may be available to an operator such that the GUI 169 is presented remotely on the presentation device of the operator and the operator can remotely monitor the game and any risk determined by the risk assessment engine 162. The risk assessment engine 162 may include a set of predefined thresholds or the operator may set a threshold value for each number of picks of potential payout maximums and roster count maximums. In one embodiment of the invention, the risk assessment engine is configured to highlight and present selection groups above a threshold in the graphical user interface with some indicia, such as highlighting the selection group in red. The risk assessment engine may also generate alerts, which can be auditory or may generate an e-mail notification to one or more operators. Depending upon the configuration by the operator, the risk assessment engine may automatically close individual matchups when a threshold level has been met without requiring authorization from an operator. The thresholds may be determined at the discretion of the operator, but will be based at least in part on an expected number of users submitting rosters along with historical information concerning payouts.

Figure 15A:
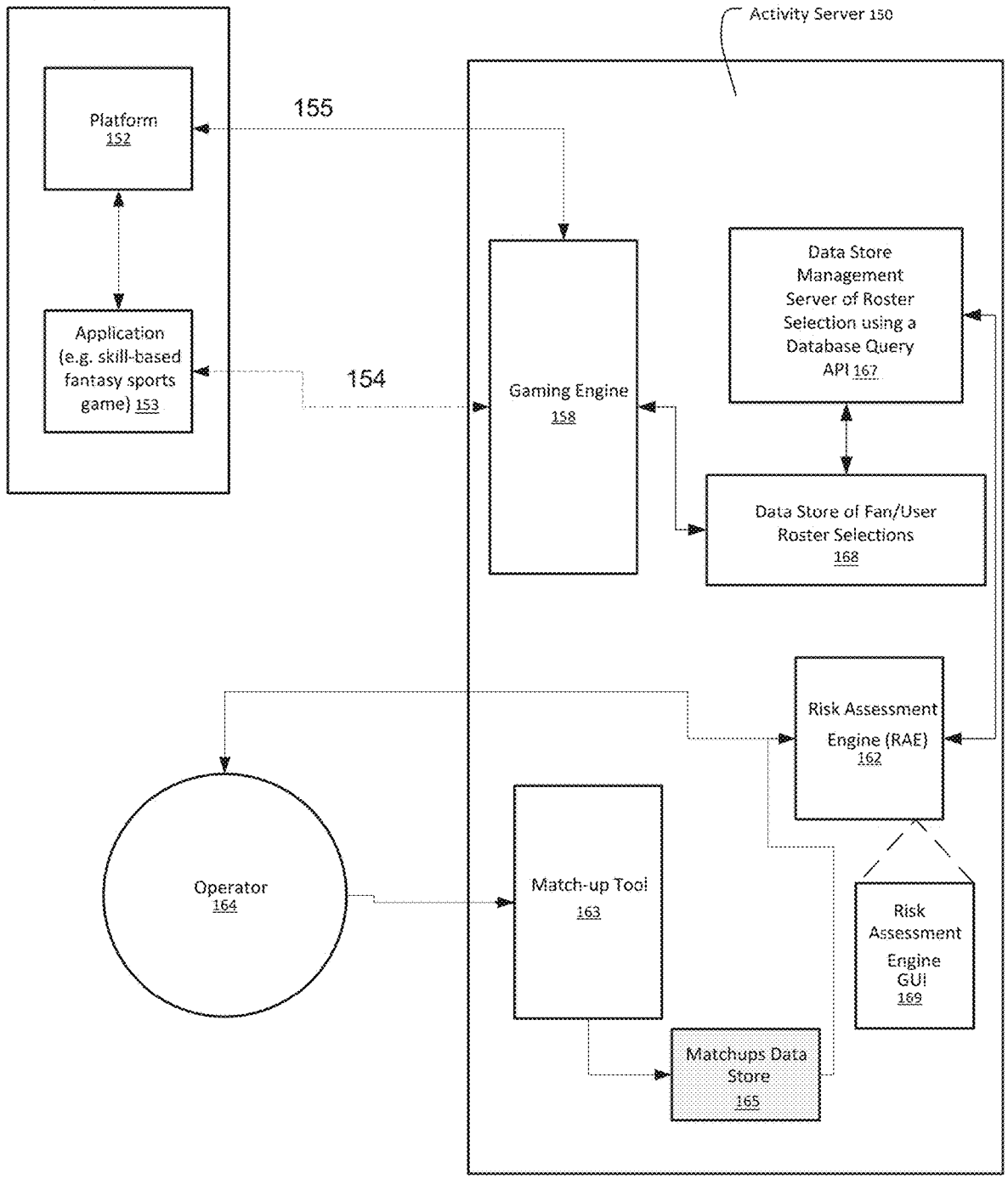
FIG. 15A shows an exemplary activity server system including a risk assessment engine that is in communication with a data store management server and associated data store containing a database of current user roster selections.

As shown in FIG. 15A, the roster selections by user playing the fantasy sports game (user roster data) are sent from the presentation device of the user through the network connection 154 between the application 153 and the gaming engine 158. The data received by the gaming engine will include the ID number for the user, a description of the selected roster including the number of picks, whether the picks include a hedge, and an array of selections for each matchup within the roster. Thus, the array will include a pointer to the selected athlete in each matchup selected by the user. Additionally, other parameters may be communicated when the roster selections are transmitted by the application 152 running on the presentation device of the user 151, including the location in which the presentation device is located. On a periodic basis or at the request of an operator, the risk assessment engine queries the data store management server 167 using a database query API to query the data store of user roster selections. The database of the data store 168 contains all of the currently active user roster selections for all of the users playing the fantasy game. The API query will produce a report to the risk assessment engine. For example, the database query may produce a report that indicates the N-riskiest selections in terms of overall possible payout disparity for matchups. It should be recognized that other database searches may be used to provide information concerning risk to the risk assessment engine. The risk assessment engine will receive the results of the database query in the form of a report, such as a data file in a predefined format in conformity with the database API. The risk assessment engine parses the report and compares the entries within the report to a threshold value that has either been preset or set by an operator. For example, the threshold could be based on a percentages of disparity, such as 80% of the users betting on one athlete or the threshold could be in the disparity of the total amount bet, such that a payout that included a matchup may exceed $500,000. Again, other thresholds can be established based upon the risk without deviating from the intended scope of the invention. It should be recognized by one or ordinary skill in the art that the data-base and data management server may operate as part of the activity server system or may be outside of the activity server system. Additionally, the data store management server may periodically push the results of a pre-set number of database queries to the risk assessment engine within the risk assessment engine needing to query the data store management server 167.

In one embodiment of the invention, matchups may be presented on a customized basis to fans. Customization of matchups occurs in a matchup suggestion engine 159 that takes into account Fan Account Information stored in a datastore 157. For example, while a plurality of fans may be presented with the same card or set of matchups, the order of the matchups or how the matchups are presented might be customized. As one example, the first presented matchup might be selected based upon the location of the fan or based upon a fan's profile. If the matchups include a matchup involving Drew Brees, fans who are located in Louisiana or identify themselves as New Orleans Saints fans may be presented with a set of matchups where the first matchup is the matchup involving Drew Brees. Thus, the order or configuration of the matchups or even the matchups in the set of matchups might vary based upon geographic region, time of year, rankings of players or teams, fan input or profile or other criteria. In addition, the graphical presentation of the matchups might be changed based upon such criteria.

Figure 11:
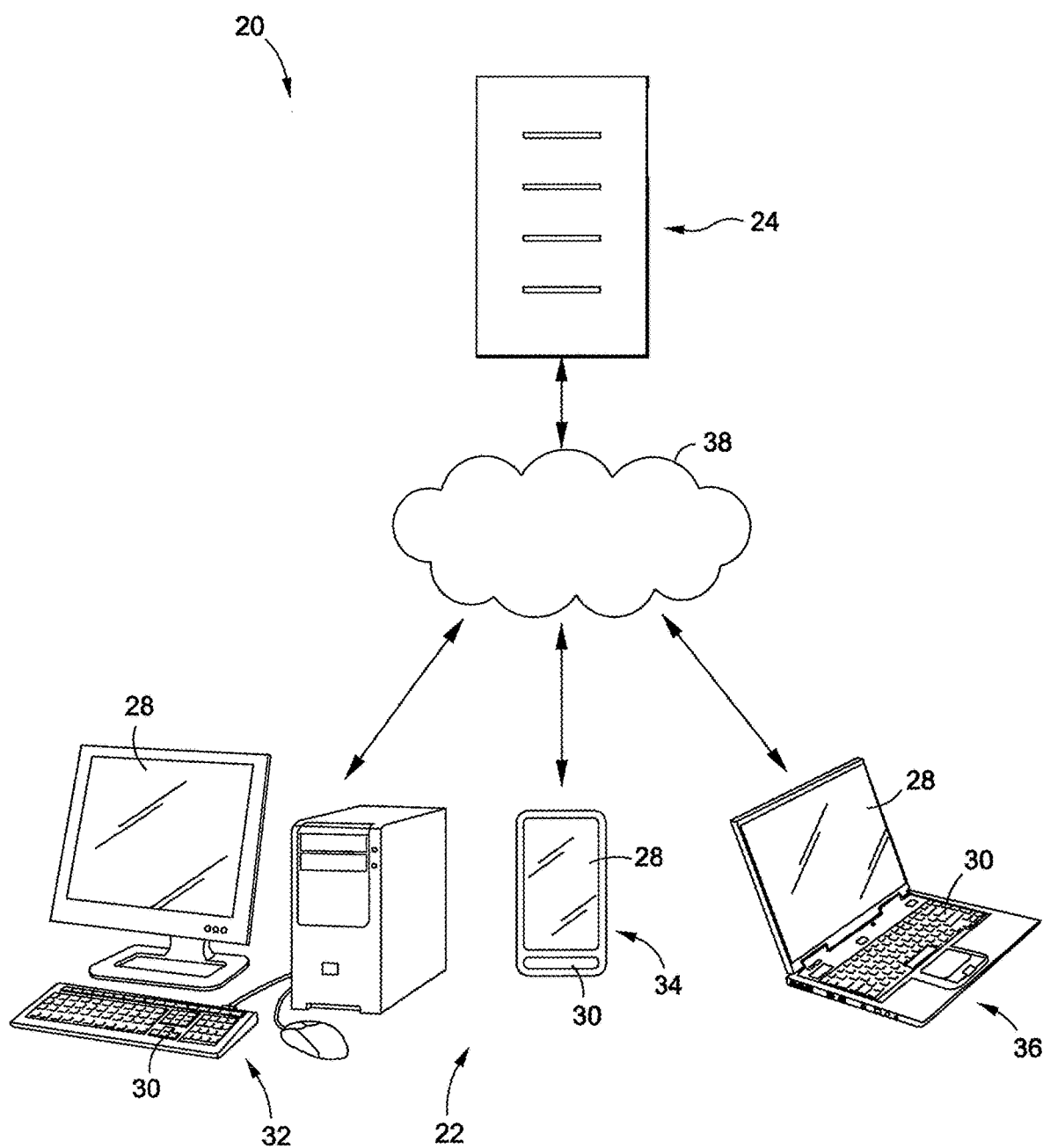
FIG. 11 shows an environment for implementing the present inventive methodology and systems in a networked environment.

The invention may be implemented in various manners, including in various environments. In one embodiment, the fantasy-sports type activity is implemented in a computing environment. One embodiment of such an environment is illustrated in FIG. 11. As illustrated, a system 20 comprises one or more presentation devices 22 and at least one activity management server 24. The presentation devices 22 may be dedicated/special purpose devices or may be general purpose devices. Preferably, the presentation devices 22 include at least one video display 28 capable of displaying activity information, at least one input device 30, and at least one communication interface. The presentation device may also be embodied in a game console, smart television, kiosks, gaming tables, gaming tablets or other device configured to communicate with the activity server system.

The presentation device 22 might comprise, for example, a desktop computer 32, a telephone (including cellular, wireless or wired telephones) or smart phone 34 (such as an iPhone® or Android® device), a laptop or notebook computer 36, tablets or various other devices.

The input device 30 might comprise, for example, a keyboard, mouse, joystick, touch-screen, button(s), trackballs or other devices now known or later configured and which are capable of receiving input from a fan. The communication interface is preferably configured to permit information or data to be exchanged from one or more remote device or locations with the presentation device 22. The one or more communication interface might support wired or wireless communications using various protocols. For example, if the presentation device 22 is a phone or PDA, the communications might be by 3G, 4G, IMT, GSM or the like. If the presentation device 22 is a desktop computer, the communications might be by TCP/IP or the like. Of course, other protocols may be used such as Bluetooth, 802.11xx and the like.

It will be appreciated that the presentation device 22 may include other components. For example, the presentation device 22 may include a main processor, a video and/or audio processor, input and output ports or the like.

In one embodiment, the presentation device 22 includes an application and a platform that have been downloaded from the activity server system or other server associated with the system. As described below, the application preferably aids in presentation of the activity, including by causing activity information to be displayed to the fan and for receiving input from the fan.

For example, the application preferably implements a user interface that allows the fan to navigate through a list of graphically displayed matchups. In one embodiment, the fan may select one of the two players of a matchup and have the next matchup presented on the display via a single touch swipe or fling gesture to a touch-sensitive display or other input device of their presentation device 22.

For example, in one embodiment, the application interface displays the first and second player on left and right sides of a screen, respectively. As shown in FIG. 3, the fan may swipe towards one of the two players. When the gesture of swiping of flinging towards one of the players is entered by the fan, the mobile client both selects the player and moves on to the next matchup. Alternatively, the fan might swipe up or down to move from the displayed matchup to another matchup without selecting either of the players. Thus, the fan may easily select and navigate the various presented matchups.

The application may further include visual indicators to aid the user in being confident that his or her intended action is accomplished. These aids include movement of the graphics displayed in coordination with the fan's touch gesture, highlighting selected portions of the graphics displayed to indicate an action, or other visual indicators that any player has been selected.

Other mobile interfaces may also be possible. For example, the mobile device may include a microphone and a voice recognition feature, which may allow the fan to select matchups and pick winners by speaking to the mobile device (or the device may be configured to receive other inputs, such as gestures, etc.). Further, although the presentation device has been described above as being a mobile device, the presentation device could also include a laptop or desktop computer, a "smart" TV, or other device (e.g. game console or TV console).

The at least one activity management server 24 is preferably one or more devices which are configured to receive a request for fan participation in an activity and to present activity information to the fan. In a preferred embodiment, the activity management server 24 comprises one or more servers and can thus, be considered an activity system (see 150 in FIG. 15). In such an embodiment, the activity management server 24 might comprise a server, which is configured as a computing device, which has a processor for executing instructions, a memory for storing data such as instructions, and at least one communication interface for forming a communication link to at least one presentation device 22. In one embodiment, the activity management server 24 might comprise or be in communication with one or more mass data storage devices, such as one or more hard drives or the like. The server 24 may store information such as player statistics, sports event schedules, images of players, data regarding matchups, fan information (as disclosed below, a fan may create an account which identifies the fan and provides contact information and the like), and other information. The server 24 might also be configured to communicate with other devices to obtain such information, such as to contact another server or device to obtain game schedule information, updated player rosters or the like.

The activity management server 24 might also include one or more user interface features. Such might comprise, for example, a user station including a video display and one or more input devices (such as a keyboard, mouse or the like). Such a user station may permit an operator to interface with and manage or control the activity management server 24, such as to change operator settings and the like.

It will be appreciated that the activity management server 24 might comprise more than one device. For example, the activity management server 24 might comprise a router and one or more separate computing devices. The functions of the various computing devices might be segregated. For example, one computing device might save and verify login information (as detailed below), while another might monitor game play via the gaming devices.

As described in more detail below, at one or more times a presentation device 22 and the activity management server 24 are linked by a communication link between their communication interfaces. The type of communication link may vary, such as depending upon the particular type of presentation device 22 and/or the communication path or protocol, which is utilized.

In one embodiment, the presentation device 22 and activity management server 24 may communicate through at least network 38. Such a network might comprise the Internet, a cellular network, a satellite communication network, and/or other networks or communication systems or devices. As another alternative, the communication link might comprise a dedicated link, such as a dedicated wired link between the devices. Further, the communication link might comprise a number of local, wide area or other networks or pathways linked together. Such networks might be public and/or private. Further, communication may occur using different channels or links, such as secure (for the exchange of sensitive/private fan data) and unsecure (for the exchange of general public information) channels.

Preferably, the activity management server 24 is configured to service or communicate with multiple presentation devices 22. In this manner, an operator can communicate with and present the activity to multiple fans. For example, an operator might operate one or more servers in specific locations, which servers serve mobile fans over a large area, such as one or more states or countries.

As indicated above, the activity management server 24 may include a matchup suggestion engine, a matchup tool and other features. Such features may be implemented by machine-readable or executable code or "software" which is stored in a tangible medium (such as in or on a data storage device). The matchup suggestion engine and/or matchup tool might access stored information or access information externally, such as to obtain player information, game schedules or the like, or to obtain photos of players when forming graphical presentations of proposed matchups.

Of course, aspects of the invention may be implemented via distributed systems or devices, via a "cloud" implementation, or using other technology now known or later developed.

Aspects of the invention may also be implemented as an "application" (i.e. downloadable, installable or installed software) which runs on the presentation device 22. For example, as indicated above, one aspect of the invention is a "mobile client" which may comprise a downloadable application. For example, a fan may download an application from the operator or from an application store. The application may be stored on the fan's presentation device 22 and then be executed by one or more processors thereof.

One advantage of the downloadable application is that a much more engaging and rich media experience may be provided to the fan. Further, enhanced security features including authentication and verification of identity, location, and other factors may be implemented on the application to deliver a compliant and secure experience for the fan.

Figure 12:
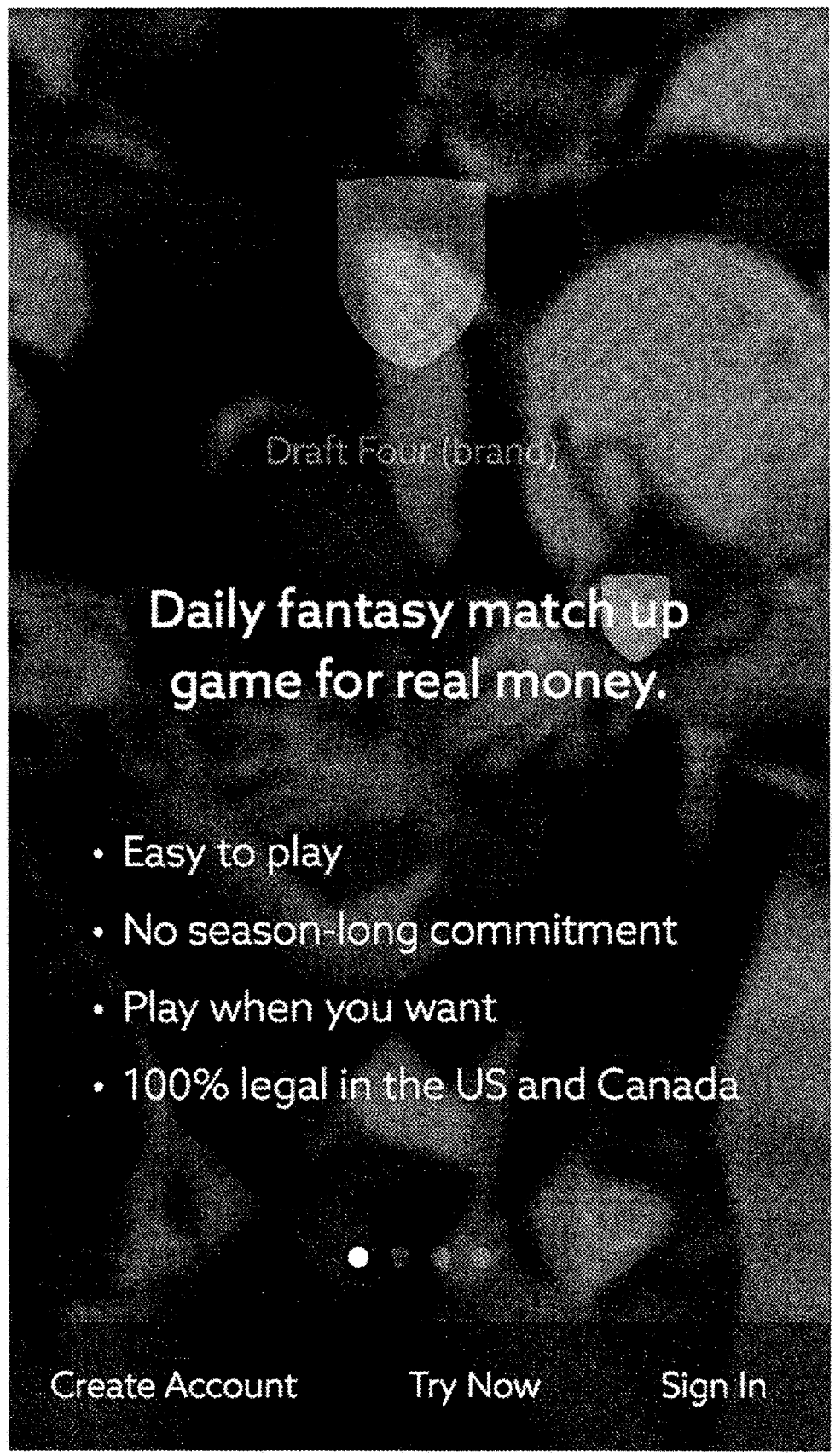
FIGS. 12-14 illustrate a sequence for managing a fan's activity account according to an exemplary embodiment of the invention.

The mobile client may be configured to interface with the activity management server 24, such as to receive information from that server 24 and to transmit information to that server 24, as well as implement other functionality. As one example, after a fan has downloaded the application, the fan may start the application. The application (alone or in conjunction with data acquired from the server 24) may cause a Welcome interface to be displayed at the fan's device, such as illustrated in FIG. 12.

Figure 13:

The fan may be required to create a user account before they are able to participate in activities. For example, by selecting the "Create Account" option from the Welcome page, the fan's device may display a new page or interface, such as illustrated in FIG. 13. This page may comprise a form into which the fan may input data which is transmitted from their device 22 to the server 24 for use in generating the account. For example, the fan may generate a user name and password, which is securely stored on the activity management server 24. The fan may submit identification information and preferences. For example, the fan may provide identifying information including birthday, gender, address, phone number, and the like. The fan may also provide various preferences including favorite sports, favorite teams, and favorite players. The fan may submit the information via his or her presentation device 22. For example, the fan may manually enter such information, or may import the information from a driver's license or other form of identification. The activity management server 24 may further acquire location information from the presentation device. The operator may require such information for purposes such as verification of a fan's age and location, such as to comply with certain laws or regulations.

In addition, the management server 24 may present different player matchups, or may change the order of player matchups based on the account information of the user. For example, of forty matchups, the activity management server 24 may present the matchups having a fan's preferred player or team before presenting the additional matchups, in order to increase the interest of the fan in those matchups.

The management server 24 may store the account information of each fan. In this manner, the management server may associate each of the fan's selections from the various matchups with the fan's account. The management server 24 is configured to send account information to the fan's presentation device 22 to allow a fan to manage his or her account.

Figure 14:
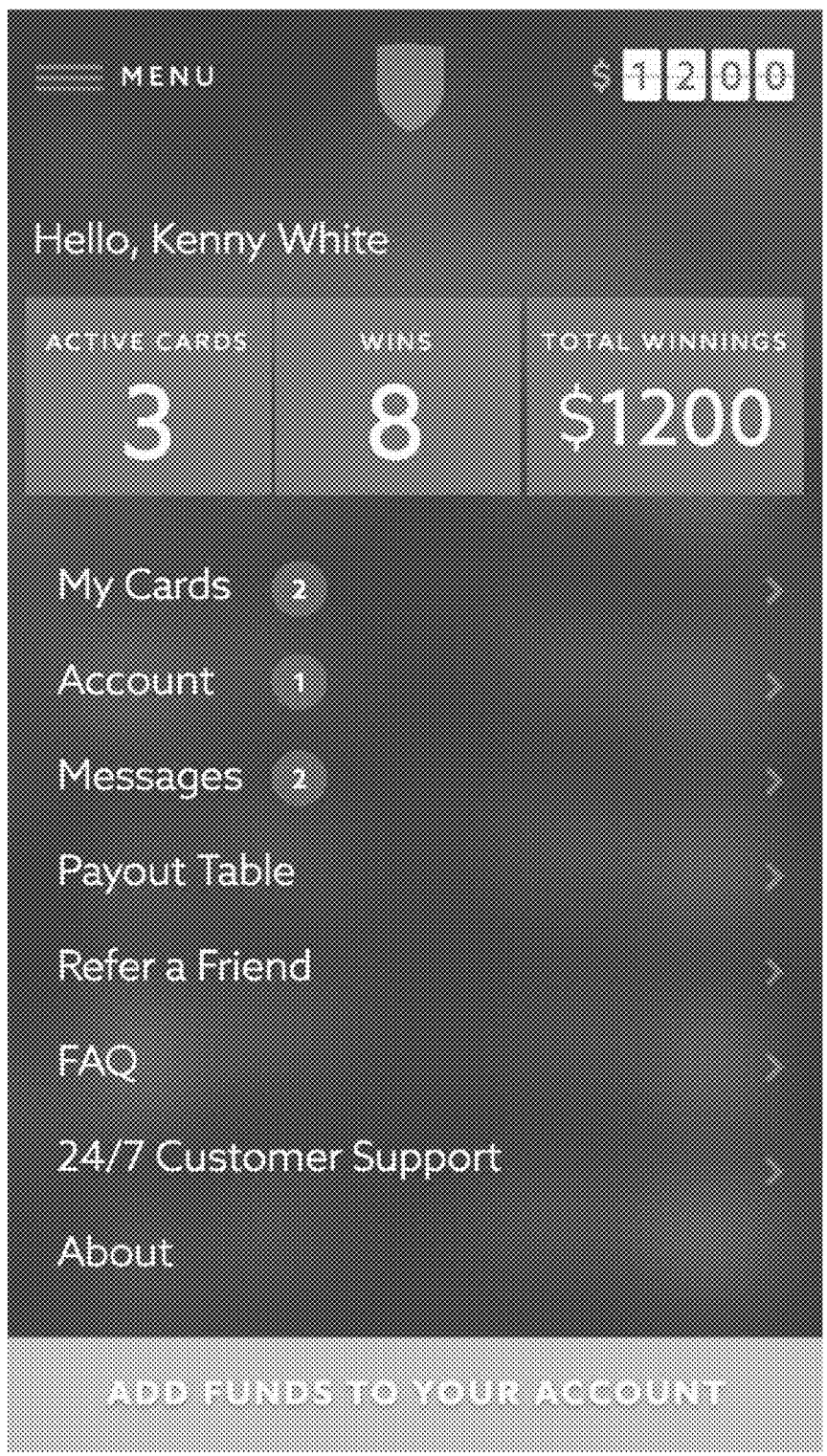

For example, as shown in FIG. 14, the fan may have the ability to view and access his or her account information on the presentation device 22. In one embodiment, the fan may view his or her current matchup cards to track the status of his or her selected matchups. The fan further may view messages from the operator concerning the fantasy sports activity, such as removal of a matchup due to an injury of a player, or a status update on one or more of the fan's cards. The fan may further update account information as necessary, or may contact customer support as needed.

The invention has a number of benefits and advantages. A particular advantage of the invention is the creation of a skill-based activity, which relates to one or more sports events and the participants thereof. The activity preferably comprises a fantasy type sports activity which does not comprise sports wagering and which is not pari-mutuel in nature Instead, in accordance with the present invention, an activity is defined which allows a fan to participate in a skill-based fantasy sports activity that does not require the time and coordination required in typical fantasy sports activities by assisting the fan in selecting a match up. Further, the outcome of the activity is measured skill of the user versus the skill of the matchmaker.—In addition, if a fan is declared a winner, the fan is paid a fixed amount (rather than a share or amount, which is based upon the number of other fans who are winners).

It will be appreciated that aspects of the invention may be implemented in other manners, other environments, or in other combinations. For example, the "swipe to select and present next information" feature of the mobile client might be implemented relative to other types of information (other than the type of activity described herein), such as an on-line shopping tool or the like.

FIG. 15 shows some of the internal components within the activity server system 150 and within the presentation device 151 of a fan. The fan first communicates through the presentation device 151 with the activity server system 150 and downloads a platform 152. The platform 152 is then run on the presentation device 151. The platform 152 provides an interface between the activity server system 150 and any platform-specific game application 153 that is downloaded to the presentation device 151. The platform 152 may perform some or all of the authentication processing and will determine if the user meets with a set of compliance criteria. The fan downloads a platform specific game application 153 to the presentation device 151 from the activity server system 150. The platform specific game application 153 includes hooks, such as API function calls to the platform. Thus, the game application 153 will only operate if authorized by the platform 152. As previously noted, the compliance criteria may be based upon local or national laws and determining whether the user complies with such laws. For example, the platform 152 may have access to GPS information, or IP-based location information and may use this information to select the compliance criteria based upon location. Additionally, the age of the fan may be pertinent as jurisdictions may have various age requirements. Thus, the platform 152 will interface with the presentation device 151 and extract information from one or more sources (e.g. GPS data, IP information) or may require the fan to enter a password or answer a series of questions to validate the fan's identity. Once the platform 152 determines that the fan is an authorized user and one that meets the compliance criteria, the platform 152 will grant access to the application game and allow the application game to either communicate 154 directly with the activity server system or communicate 155 with the activity server system 150 through the platform 152.

The activity server system 150 may include one or more servers (e.g. management server 24) and may operate in a distributed computing environment. Thus, the functionality performed by the computer-based modules of the activity server system may be distributed across processors. The presentation device 151 of the fan interfaces with one or more computer-based modules of the activity server 150 through a communications network. The activity server system 150 will receive a request to play a game from the presentation device at an authentication engine 156 and will receive a key that indicates that the platform 152 has confirmed compliance. The authentication engine 156 will access a fan account information module 157 and will obtain the account information for the specified fan. The authentication engine 156 may perform additional authentication based upon data passed from the platform and the fan's account information.

Once the authentication engine 156 is satisfied, the authentication engine will access the gaming engine 158. The gaming engine 158 provides game information (i.e. matchup data, graphical images, statistics) to the game application 153 on the presentation device 151. The game engine 158 is in communication with a matchup suggestion engine 159, an image database 160, a participant statistics and historical information database 161. The game engine 158 gathers this information and formats the information in accordance with a protocol that will be recognized and understood by the game application. The game application 153 will receive the data and incorporate the data into one or more templates for presentation to the user. Additionally, the application program 153 will provide an interface for the transmission of selection data and other game related data to the game engine 158.

The matchup suggestion engine 159, will provide a series of matchups to the game engine 158 based upon a plurality of factors including: the specific fan and his likes and dislikes (e.g. as to teams or particular participants etc.), a risk assessment engine 162 determination, and a set of predetermined matchups. The predetermined matchups are determined by an operator, who is knowledgeable about the specific activity associated with the fantasy activity of the game.

A matchup tool 163 is provided to the operator for assisting the operator in his selections. The matchup tool 163 may include a graphical interface and accesses participant statistics and historical data in a database 161. The operator 164 determines these matchups and the predetermined matchups are stored in a matchup database 165.

The matchup suggestion engine 159 will communicate with a risk assessment engine 162. The risk assessment engine 162 receives all of the predetermined matchups from the database 165 and determines whether matchups should be eliminated based upon a criteria set. As expressed above, the risk assessment engine 162 may eliminate matchups based upon player injures or if a determination is made that the matchup is no longer an even match. The risk assessment engine 162 may receive data from one or more locations about matchups selection by users. If the matchup selections reach a predetermined percentage in favor of one of the participants, the risk assessment engine 162 may remove the matchup from the list of possible matchups. It should be understood by one of ordinary skill in the art that other analytical tools may be used for assessing risk and making determinations about, which matchups to eliminate from presentation. Additionally, it should be recognized that the risk assessment engine 162 continues to operate during the playing of the sports games and can causes the matchups displayed between end-users to change. The risk assessment engine may allow for an operator to respond to the identification of a risk and to take action based on that risk by instructing the activity server and 150 to change the predetermined matchups as stored in data source 165. Risk can be identified based upon information, such as a report about an athlete, an injury report, information posted on a news or blog website. The risk assessment engine may include a web monitoring tool for each player that is part of a matchup, such that information about the player is collected and represented to an operator. Additionally, the risk assessment engine may be regularly updated based upon wagers that occur. For example, the risk assessment engine may provide a listing of the 10 highest matchups with the greatest risk. The risk could be based simply on an imbalance in sales or on a more complex formula. Additionally, the risk assessment engine 162 may monitor all of the selections by users and identify if there are imbalances based upon groups of matchups that show an imbalance in the selected matchups. The risk assessment engine includes a graphical user interface that displays the matchups with the greatest risk and reports on developing news about players where imbalances in matchup selections are occurring. For example, the 30 highest matchups that have the greatest risk may be presented and a news ticker of information about the players in the matchups may be included from either a general web search or by monitoring specific websites (sports-related websites, e.g. ESPN, NBA, MLB etc. or fantasy sports-related websites) for the names of the players in the matchups. Thus, the risk assessment engine, allows for monitoring of risk in real-time.

In embodiments of the invention, the risk assessment engine can be automated based upon threshold values to remove matchups. For example, there may be a monetary threshold for a matchup that will cause the matchup to be removed, such as a $500,000 differential in bets on one player or if more than 80% of the wagers are on one player.

The risk assessment engine 162 passes the matchups to the matchup selection engine 159. The matchup suggestion engine 159 may then further eliminate some of the matchups. For example, matchups that include a participant from a favored team of the fan may be preferred. Similarly, matchups that include participants from a team that the fan does not like will be given a lower priority. Other factors may be used by the matchup selection engine 159 in determining the matchups to present as discussed above.

The game engine 158 will then send the pruned matchups from the matchup selection engine 159 along with images of the participants in the matchups, statistics of the participants and other data needed by the application game 153 for providing the intended visual and game experience to the fan on the presentation device 151 through a secure network connection 154. It should be recognized that the platform 152 and the application 153 are client programs that run locally on the presentation device of the user. The various components of the activity server system can communicate with one another through an Application Programming Interface (API) 170. The API allows for the communication of the game information between the application 153 and the gaming engine 158. Additionally, the API can be used for supplying both tools such as the match-up tool and the risk assessment engine to a presentation device of the operator 164 in the form a client programs 172, so that the operator may remotely monitor and make changes to the game without the need to be directly connected to the activity server system 150. The application game 153 will receive this data and will incorporate the data into one or more templates for presentation on the display associated with the presentation device 151. Communication will continue between the game engine 158 and the application game 153 until the end of the session. The fan's selection will be saved and stored in a database 157 associated with the fan's account. The game engine 158 includes a settlement engine 171 that will also determine whether the user has selected one or more winning participants and will inform the application game 153 whether the fan has won the game based upon the game rules. The settlement engine is also configured to provide payment to a winning user and may interact with the fan account information data store 157 to determine where any winnings should be transferred (e.g. a banking account, such as a checking account or other account such as PayPal account).

In one embodiment of the invention, the game engine allows a fan to pick from a plurality of matchups and the user can also select between different parlay options. The parlay payouts may be determined in the gaming engine or may be determined in another server and imported into the activity server system 150.

The Graduated Payout Table system is a method for providing multiple user options for parlay purchases. These options allow the user to select between hedge values that provide various levels of risk versus payout. The payout multipliers are dependent on the number of picks, the number of wins, and the user selected hedge value. The Graduated Payout Table is a three dimensional array whose axes are represented by picks, wins, and hedge. For any purchase, the final payout is the array value determined by those parameters.

A 3D Graduated Payout Table can be calculated from a standard one-dimensional flat payout table as commonly used to generate parlay payouts. The result Graduated Payout Table provides equivalent risk and odds performance for the house and for the end user. The result of truncating or shaving any data value or values is a table that in all ways provides equal or better risk in favor of the house.

The Graduated Payout Table is generated based on the premise that the payout odds for certain types of simple purchases (picking 4 of 4 matches, 5 of 5 matches, 6 of 6 matches) can be combined in such a way as to demonstrate that those odds are equivalent to other more complicated purchases (4 out of 5 matches, 5 out of 6 matches, 3 out of 5 matches etc.). In this manner, a composite purchase is defined that allows various payout options based on performance (number of wins), having the risk of the set of simple purchases. The risk for the composite purchase is the sum of the risk values for the simple purchases in the set. In order to simplify the explanation for the graduated payout table a default payout table is assumed for simple purchases. It should be recognized by one of ordinary skill in the art that other default payout schema may be used without deviating from the invented scope of the invention.

| 1. Default Flat Payout Table. | | | | | | | | |
|---|---|---|---|---|---|---|---|---|
| Picks | 3 | 4 | 5 | 6 | 7 | 8 | 9 | 10 |
| Payout | 5-for-1 | 10-for-1 | 18-for-1 | 35-for-1 | 70-for-1 | 125-for-1 | 250-for-1 | 500-for-1 |

FIG. 1. Default Flat Payout Table

Composite Purchase Definition: A 10-Pick Parlay in which 10-Wins payout is X-for-1 and 9-Wins payout is Y-for-1. Fewer Wins result in zero payout. In order to determine the equivalent set of simple parlay purchases, there is some combination of 10-Pick Simple Parlays and 9-Pick Simple Parlays that is equivalent to the Composite Purchase. A 'Simple Parlay' is a purchase in which all of the Picks must be Wins. One equivalent combination is one 10-Pick and ten 9-Picks, where all of the picks are the same 10 matchups selected in the Composite Purchase. Purchase amounts and final payouts still need to be calculated. For example, an $11.00 total purchase. For the Composite Purchase, that is one purchase for $11.00. For the equivalent set of simple purchases, there is one 10-Pick for $1.00 and ten 9-Picks for $1.00 each in which each of the 9-Picks choose a different combination of the original ten Matchups.

In both cases, the user has now spent $11.00. This purchased the single Composite Purchase or the 11 simple purchases. For the 11 simple purchases, we can calculate the user's odds of winning and the potential payout for every possible outcome as follows:
If all 10 selections Win, then the user Wins his 10-Pick and all ten of his 9-Picks. The 10-Pick pays out at 500-for-1 according to the flat payout table. The 9-Picks each pay out at 250-for-1 according to the same payout table. Therefore, the total win is:

Payout=$1.00·500+10·$1.00·250=$500.00+
$2500.00=$3000.00.

If any 9 of the 10 selections Win, then exactly one of the user's 9-Pick purchases will win and pay out at 250-for-1. Therefore, the total win is:

Payout=$1.00·250=$250.00.

If fewer than 9 of the 10 selections Win, then all 11 of the user's purchases are Losers and the payout is zero. Looking at the combination of 11 separate purchases as a single entity, the payout equivalencies are 272-for-1 if all 10 picks Win and 22-for-1 if nine of the 10 picks Win, as demonstrated in FIG. 2. Composite Payouts 10-Picks Hedge=1.

| | $11.00 Purchase | Normalized | Pretty* |
|---|---|---|---|
| 10-Wins | $3000.00 | 272.72-for-1† | 250-for-1 |
| 9-Wins | $ 250.00 | 22.73-for-1‡ | 20-for-1 |

FIG. 2. Composite Payouts 10-Picks Hedge = 1

Hedge is a purchase definition parameter that defines the maximum number of selections that are permitted to Lose in a Composite purchase that has a non-zero payout. The traditional simple 10-Pick parlay purchase requires all selections to Win in order for any payout to occur. Therefore, Hedge=0. The Example above provides payout for a minimum of 9-Wins, which is '1' less than the number of Picks. Hence, Hedge=1.

The next example provides payout for 8-Wins in a 10-Pick parlay. Hence, Hedge=2. Consider a $56.00 Composite Purchase where 8, 9, or 10 Wins provide payouts. The equivalent individual purchases are:
1 $1.00 10-Pick purchase
10 $1.00 9-Pick purchases
45 $1.00 8-Pick purchases
If all 10 selections Win, then the user Wins his 10-Pick and all ten of his 9-Picks and all 45 of his 8-Picks. The 10-Pick pays out at 500-for-1, the 9-Picks each pay out at 250-for-1, and the 8-Picks each payout at 125-for-1. Therefore, the total win is:

Payout=$1.00·500+10·$1.00·250+
45·$1.00·125=$500.00+$2500.00+
$5625.00=$8625.00.

If any 9 of the 10 selections Win, then exactly one of the user's 9-Pick purchases will win and pay out at 250-for-1 and nine of the user's 8-Pick purchases will win and pay out at 125-for-1. Therefore, the total win is:

Payout=$1.00·250+9·$1.00·125=$250.00+
$1125.00=$1375.00.

If anyone combination of 8 of the 10 selections Win, then exactly one of the user's 8-Pick purchases will win and pay 125-for-1. Therefore, the total win is:

Payout=$1.00·125=$125.00.

| | $56.00 Purchase | Normalized | Pretty |
|---|---|---|---|
| 10-Wins | $8625.00 | 154.01-for-1 | 150-for-1 |
| 9-Wins | $1375.00 | 24.55-for-1 | 20-for-1 |
| 8-Wins | $ 125.00 | 2.23-for-1 | 2-for-1 |

FIG. 3. Composite Payouts 10-Picks Hedge = 2

The number of combinations of R objects in a set of N objects is:

combinations=$N!/(R!(N-R)!)$

Both of the examples use the intuitively obvious case of 9 parlays with 10 selections.
In this case

10!/(9!·1!)=3628800/(362880·1)=10.

Thus, there are 10 possible ways to arrange 10 selections into 9-Picks.
Similarly for 8-Picks in 10 possible selections, there are:

10!/(8!·2!)=3628800/(40320·2)=3628800/80640=45.

There are 45 ways to build 8-Pick purchases from a set of 10 total selections.
Also, there are 1+10+45=56 ways to build 8, 9, or 10-Pick parlays out of 10 selections.

Certain constraints apply to the mathematical formula when applied to a real-world game. One is that the number of possible picks needs to be supported by a pre-defined payout table. The minimum number of picks is limited to the number of picks supported by the current payout table. Further, the number of wins is constrained to between 0 and the number of user picks. [0, Picks]. The Hedge value varies inversely with the payout value, such that the higher the Hedge value, the lower the payout value, and payout values quickly dip well below 1.0. In one version of the invention fractional payouts are not supported so that the hedge value is constrained to a lower bound of 1.

The above discussed methodology may be implemented in computer code for operation on a computer system for determining graduated payout tables based upon a predetermined payout table. Provided below is pseudo code for the determination of the graduated payout tables. The methodology can be employed in the gaming engine 158 based upon the criteria of the game such as the number of possible matchups, possible hedges, and the predefined payout table prior to a game becoming active and available for a user/fan. In other embodiments, the graduated payout tables may be precalculated and stored in a data store and accessed and used by the gaming engine 158 when registering a user's matchups and hedge selection and upon payout to the user based on the conclusion of the all of the games for which a user has selected matchups.

```
// Default Flat Payout Table
const int maxPayoutTable[ ] = {
0, // 0 Picks
0, // 1 Pick
0, // 2 Picks
5, // 3 Picks
10, // 4 Picks
18, // 5 Picks
35, // 6 Picks
70, // 7 Picks
125, // 8 Picks
250, // 9 Picks
500 // 10 Picks
};
// 'comboCount' is the table of combinations of n items in m samples.
//
// n | 1 2 3 4 5 6 7 8 9 10
// ======|=====================================
```

-continued

```
// m = 4 | 4 6 4 1
// m = 5 | 5 10 10 5 1
// m = 6 | 6 15 20 15 6 1
// m = 7 | 7 21 35 35 21 7 1
// m = 8 | 8 28 56 70 56 28 8 1
// m = 9 | 9 36 84 126 126 84 36 9 1
// m = 10 | 10 45 120 210 252 210 120 45 10 1
// Total number of purchases is the sum of combinations at
// each supported (hedged) level.
int calculatePurchaseCount(const int nPick, const int nHedge) {
int totalCount = 0;
for(int iHedge = 0; iHedge <= nHedge; iHedge++) {
const int n = nPick – iHedge;
const int m = nPick;
const int nCombos = comboCount[n][m];
totalCount += nCombos;
}
return totalCount;
}
double calculatePayout(const int nPick, const int nHedge, const int nWin)
{
int sumPay = 0;
for(int iHedge = 0; iHedge <= nHedge; iHedge++) {
const int iPick = nPick – iHedge;
if(nWin >= iPick) {
const int nCombos = comboCount[iPick][nWin];
const int iPay = maxPayoutTable[iPick];
sumPay += iPay * nCombos;
}
}
const int purchaseCount = calculatePurchaseCount(nPick, nHedge);
return (double)sumPay / purchaseCount;
}
```

The result of the algorithm is the graduated payout tables, which are provided below and are based upon the predefined default flat payout table as shown in FIG. 1. The 'Exact' version of the graduated payout table is displayed exactly as calculated. The 'Proposed' version is displayed with payout values rounded down to integers.

Graduated Payout Table Exact

Number of Picks (1 through 7):

| 1, | 2, | 3, | 4, | 5, | 6, | 7, | Hedge |
|---|---|---|---|---|---|---|---|
| [null, | null, | [5.0], | [10.0], | [18.0], | [35.0], | [70.0], // | 0 |
| [null, | null, | null, | null, | [11.3, 1.7], | [20.4, 2.6], | [39.4, 4.4], // | 1 |
| [null, | null, | null, | null, | null, | [13.3, 3.1, 0.5], | [23.9, 4.9, 0.6], // | 2 |
| [null, | null, | null, | null, | null, | null, | [16.3, 4.6, 1.1, 0.2], // | 3 |
| [null, | null, | null, | null, | null, | null, | null, // | 4 |
| [null, | null, | null, | null, | null, | null, | null, // | 5 |
| [null, | null, | null, | null, | null, | null, | null, // | 6 |

Number of Picks (8 through 10):

| 8, | 9, | 10 | Hedge |
|---|---|---|---|
| [125.0], | [250.0], | [500.0]], // | 0 |
| [76.1, 7.8], | [137.5, 12.5], | [272.7, 22.71]], // | 1 |
| [45.0, 8.5, 0.9], | [84.7, 14.9, 1.5], | [154.0, 24.6, 2.2]], // | 2 |
| [28.7, 7.5, 1.5, 0.2], | [52.6, 12.8, 2.4, 0.3], | [96.7, 22.1, 3.9, 0.4]], // | 3 |
| [20.7, 6.4, 1.8, 0.4, 0.1], | [3 5.6, 10.4, 2.7, 0.6, 0.1], | [63.1, 17.7, 4.3, 0.8, 0.1]], // | 4 |
| | null, [27.1, 8.8, 2.7, 0.8, 0.2], | [45.3, 14.3, 4.2, 1.1, 0.2]], // | 5 |
| | null, | null, [36.6, 12.2, 4.0, 1.2, 0.3, 0.1]] // | 6 |

Graduated Payout Table Proposed

Number of Picks:

| 1, | 2, | 3, | 4, | 5, | 6, | 7, | 8, | 9, | 10 | Hedge |
|---|---|---|---|---|---|---|---|---|---|---|
| [null, | null, | [5], | [10], | [18], | [35], | [70], | [125], | [250], | [500]], // | 0 |
| [null, | null, | null, | null, | [10, 1], | [20, 2], | [35, 4], | [75, 5], | [130, 10], | [250, 20]], // | 1 |

-continued

Graduated Payout Table Proposed

Number of Picks:

[null, null, null, null, null, [10, 3], [15, 4, 1], [40, 8], [80, 10, 1], [150, 20, 2]], // 2
[null, null, null, null, null, null, null, [25, 5, 1], [50, 10, 2], [40, 10, 4]] // 3

After all the games have ended for all of the matchups for a user, the system moves toward settlement with the user through settlement engine 171. In some instances, degradation of matchups may occur. Degradation occurs when matchups are cancelled for various reasons (due to injury, lack of playing time by a player, unusual betting practices etc.). This will cause at least one of the matchups selected by a user to be void and if the user has selected standard payout (pick all winning matchups), the user will be provided with a N−1 payout from the standard payout table if all of the user's other picks are winning picks. In the case where, settlement occurs and the user has selected a parlay for payment based upon the graduated payout tables, settlement can occur as with the standard payout tables. However in an embodiment of the invention, the user selected 'Hedge' value is used for the degraded roster. If the new pick value does not support the selected Hedge value, the next lower Hedge value is used instead. For example, if the user purchased a 6-Pick Roster with Hedge=1 and the Roster are degraded to a 5-Pick, the supported value Hedge=1 will still be used. As another example, for the same 6-Pick Roster but with Hedge=2, when the Roster is degraded to a 5-Pick, the Hedge value must also be degraded to Hedge=1, because that is the highest Hedge value supported for a 5-Pick parlay.

It will be understood that the above described arrangements of apparatus and the method there from are merely illustrative of applications of the principles of this invention and many other embodiments and modifications may be made without departing from the spirit and scope of the invention as defined in the claims.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A system for presenting a skill-based game, the system comprising:
a non-transitory storage medium storing machine readable code;
at least one activity server system comprising a processor configured to execute the machine readable code and to communicate over a wide area network with a plurality of presentation computing devices, each distinct one of the presentation computing devices associated with a distinct one of a plurality of users, and to receive information from the plurality of presentation computing devices; and
a device storage system coupled to the activity server system storing (i) information concerning a plurality of users, each user identifiable by a user account, and (ii) event data pertinent to a set of scheduled events and a pool of participants in the set of scheduled events;
wherein, the machine-readable code, when executed by the activity server system, causes performance of computer processes comprising:
separately responsive to communications initiated from each of the presentation computing devices, serving, over the wide area network, to the presentation devices, a set of matchups, wherein each matchup offers, to a given user, an opportunity to make a choice selected from the group consisting of (i) a first set of participants, from among a plurality of sets of participants in the pool of participants, projected by the given user to achieve a first fantasy score superior to a second fantasy score of a second set of participants and (ii) a projection by the given user that a third fantasy score of a third set of participants will be over, or under, a projected fantasy score of the third set of participants projected by the activity server system, along with associated fixed-payout odds based on winning criteria, so as to cause each of the presentation devices to display the set of matchups and the associated fixed payout odds on a corresponding graphical user interface;
receiving, separately, from each of the presentation devices, over the wide area network, user roster data characterizing a set of user-selected winners with respect to selected matchups;
updating the event data pertinent to participants in the scheduled events; and
using the updated data to calculate and assign payoffs to the users based on both the set of user-selected winners and the fixed payoff odds, wherein determination of whether a given user is a winner or loser is based solely upon the given user's selections and not on those of other users:
wherein the machine-readable code, when executed by the activity server system, causes performance of computer processes further comprising:
receiving, by the activity server system, schedule information about a plurality of games from an information source containing the schedule information;
determining, by the activity server system, participants expected to compete in the plurality of games by accessing player information from an information source containing the player information;
evaluating, by the activity server system, using an automated process based upon statistical analysis and historical fantasy point performance values, for each of the participants, in the pool of participants, to determine statistically expected fantasy point performance values to be scored by the participants in a next game; and
causing display, by the activity server system, on the corresponding graphical user interface, of each participant in the set of matchups, wherein the corresponding graphical user interface allows the given user to make the choice.

2. The system according to claim 1, wherein the machine-readable code, when executed by the activity server system, causes performance of computer processes further comprising:
in a matchup selection tool process, creating and modifying the set of matchups based on a plurality of participants, and transmitting the set of matchups to the users.

3. The system according to claim 2, wherein the matchup selection tool process further includes presenting information about the participants including expected fantasy points for each participant for an upcoming event.

4. The system according to claim 2, wherein the machine-readable code, when executed by the activity server system, causes performance of computer processes further comprising:
in a risk assessment engine process:
determining a total possible payout based upon the user-selected winners for a selected matchup;
comparing the total possible payout with a predetermined threshold; and
if the total possible payout exceeds the threshold, removing the selected matchup from the set of matchups to be served thereafter.

5. The system according to claim 1, wherein receiving the user roster data includes receiving, from at least some of the presentation devices, as part of the roster data user-selected hedge value by which a given user specifies a minimum number of a total number of matchup outcome selections made by the given user that must be correct in order for the given user to win.

6. The system according to claim 5, wherein:
the machine-readable code, when executed by the activity server system, causes performance of computer processes further comprising calculating a graduated payout table based on the fixed payout odds; and
serving over the wide area network a set of matchups of participants along with associated fixed payout odds to the presentation devices further comprises serving the graduated payout table.

7. The system according to claim 1, wherein ranking further comprises:
for each participant:
providing by the server system a filter to the matchmaker for filtering relevant historical fantasy point performance values for the participant from a set of historical fantasy point performance values based upon a criteria set;
predicting, based on the historical fantasy point performance values, by the server system an expected team fantasy point performance value for the team of the participant for the same game; and
determining, by the server system, the statistically expected fantasy performance values of the participant based on the filtered relevant historical fantasy points performance values weighted by the predicted team fantasy point performance value divided by a historical team fantasy point performance value.

8. The system according to claim 7, wherein determining the statistically expected fantasy performance values of the participant based on filtered relevant historical fantasy points performance values includes using the predicted team fantasy point performance value that has been filtered based on the criteria set.

9. The system according to claim 7, wherein the computer processes further comprise, after determining the statistically expected fantasy point performance values for the participants, ordering the participants according to statistically expected fantasy point values.

10. The system according to claim 9, wherein causing display by the server system of the identities of the participants further includes causing display of the identities of the participants according to a position.

11. The system according to claim 7, wherein the computer processes further comprise:
receiving an input from the matchmaker defining a selection of individual to assign to a matchup;
allowing a matchmaker to review the list of participants and expected fantasy point performance values and to select individual participants to assign to a matchup; and
storing the assignment of participants to the matchup in a matchup data store.

12. The system according to claim 1, wherein the criteria set for filtering the relevant historical fantasy point performance values includes at least one of number of previous games played, duration of play within the games, algorithm selection, venue, and characteristic of at least one member of the opposing team.

13. The system according to claim 1, wherein the machine-readable code, when executed by the activity server system, causes performance of computer processes further comprising:
in a computer-based risk assessment engine process,
querying the data store to identify, among users' matchup selections, those instances in which there is a disparity in frequency of selection of a specific one of the two participants in a selected matchup, and wherein the disparity in frequency of selection exceeds a first threshold;
when such a matchup with a disproportionate number of users selecting one of the two participants in a matchup has been identified, determining whether the number exceeds a first threshold;
if the number exceeds the first threshold, removing or modifying the matchup from the set of matchups for all subsequent requests for serving the set of matchups, if the disparity in frequency of selection exceeds the first threshold, then also determining whether a total potential payout associated those instances can exceed a second threshold;
if the total potential payout associated with those instances can exceed the second threshold, then removing the selected matchup from the set of matchups or modifying the odds payout associated with the selected matchup.

14. The system according to claim 1, wherein the machine-readable code, when executed by the activity server system, causes performance of computer processes further comprising:
monitoring electronic information sources about mentions of participants in the set of matchups and monitoring for keywords including the keyword "injury" and if a mention of a participant occurs on an electronic information source and a keyword is identified, producing a graphical alert to an operator, the graphical alert allowing the operator to remove one or more matchups.

15. The system according to claim 14, wherein at least some of the matchups are pre-selected to be closely or evenly matched with respect to an expected outcome.

16. The system according to claim 15, wherein the pre-selected matchups are based on the statistical analysis of matchup participants.

17. The system according to claim 14, further comprising:
dynamically updating the set of matchups based on real-time information affecting at least one of the matchups.

18. The system according to claim 14, wherein the users are required to participate in at least a predetermined minimum number of matchups from the set of presented matchups.

* * * * *